(12) United States Patent
Watanabe et al.

(10) Patent No.: US 10,739,950 B2
(45) Date of Patent: Aug. 11, 2020

(54) USER INTERFACE WITH A CUSTOMIZED MENU

(71) Applicant: CANON KABUSHIKI KAISHA, Tokyo (JP)

(72) Inventors: Satoshi Watanabe, Tokyo (JP); Emi Kondo, Tokyo (JP); Tomoaki Takahashi, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/280,697

(22) Filed: Feb. 20, 2019

(65) Prior Publication Data

US 2019/0179498 A1 Jun. 13, 2019

Related U.S. Application Data

(62) Division of application No. 14/851,984, filed on Sep. 11, 2015, now Pat. No. 10,254,922.

(30) Foreign Application Priority Data

Sep. 12, 2014 (JP) ................................. 2014-186864
Sep. 12, 2014 (JP) ................................. 2014-186865
Sep. 12, 2014 (JP) ................................. 2014-187036

(51) Int. Cl.
*G06F 3/0482* (2013.01)
*G06F 3/0484* (2013.01)
(Continued)

(52) U.S. Cl.
CPC ........ *G06F 3/0482* (2013.01); *G06F 3/04847* (2013.01); *H04N 1/0035* (2013.01); *H04N 5/23293* (2013.01)

(58) Field of Classification Search
CPC .................................................... G06F 3/0482
See application file for complete search history.

(56) References Cited

U.S. PATENT DOCUMENTS 6,785,822 B1    8/2004   Sadhwani-Tully
8,843,853 B1*   9/2014   Smoak .................. G06F 3/0482
                                                        715/839

(Continued)

FOREIGN PATENT DOCUMENTS

CN    101285880 A    10/2008
CN    102203711 A    9/2011

(Continued)

OTHER PUBLICATIONS

Wilbert O. Galiz, The Essential Guide to User Interface Design (2d ed. Wiley 2002) 786 pgs.

(Continued)

*Primary Examiner* — Asher D Kells
(74) *Attorney, Agent, or Firm* — Cowan, Liebowitz & Latman, P.C.

(57) ABSTRACT

An electronic apparatus comprises a registration unit which registers a menu item in a menu having a hierarchical structure, and a display control unit which (i) displays a first-type item and a second-type item as options in a specific layer of the menu, (ii) performs control to display a first menu item in a menu in a lower layer below a layer of the first-type item, the first menu item being used to register a menu item in the same menu and to delete a registered menu item, and (iii) displays a second menu item in a menu in a lower layer below a layer of the second-type item, the second menu item being for deleting a registered menu item that is in the menu in the lower layer below the layer of the first-type item.

12 Claims, 36 Drawing Sheets

(51) Int. Cl.
*H04N 1/00* (2006.01)
*H04N 5/232* (2006.01)

(56) References Cited

U.S. PATENT DOCUMENTS

| | | | |
|---|---|---|---|
| 2002/0054146 A1* | 5/2002 | Fukumoto | G06F 3/0482 |
| | | | 715/810 |
| 2004/0051741 A1 | 3/2004 | Venturino | |
| 2008/0106630 A1* | 5/2008 | Matsuda | G03B 15/05 |
| | | | 348/333.01 |
| 2009/0007009 A1 | 1/2009 | Luneau et al. | |
| 2010/0199211 A1 | 8/2010 | Igawa et al. | |

FOREIGN PATENT DOCUMENTS

| | | |
|---|---|---|
| CN | 103095986 A | 5/2013 |
| JP | 2006-099803 A | 4/2006 |
| JP | 2008-203910 A | 9/2008 |
| JP | 2008-205841 A | 9/2008 |
| JP | 2010-011219 A | 1/2010 |
| JP | 2012-237809 A | 12/2012 |
| JP | 2013-097455 A | 5/2013 |

OTHER PUBLICATIONS

The above patent documents #3 and #7 were cited in a May 29, 2018 Japanese Office Action, which is enclosed with an English Translation, that issued in Japanese Patent Application No. 2014186865. The above U.S. patent publication #1 and Foreign patent documents #2, 4, 6, and 8 were cited in a Feb. 13, 2018 Chinese Office Action, which is enclosed with an English Translation, that issued in Chinese Patent Application No. 201510579702.4.

* cited by examiner

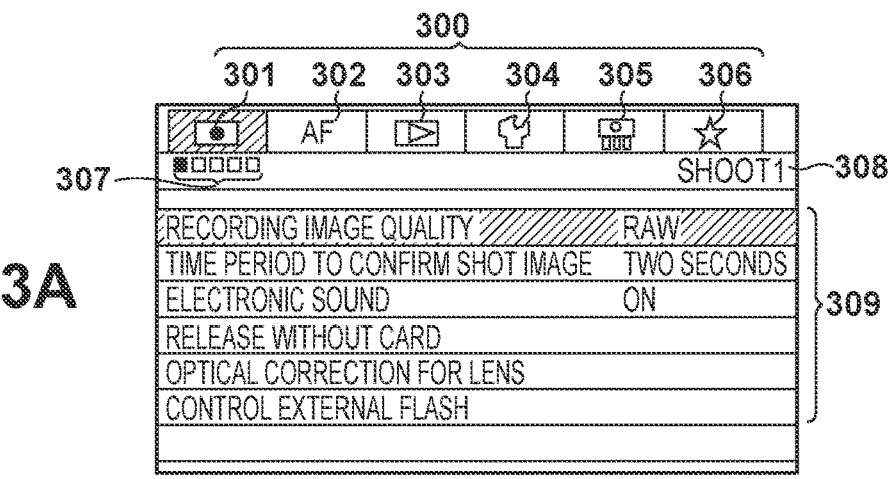
FIG. 3A
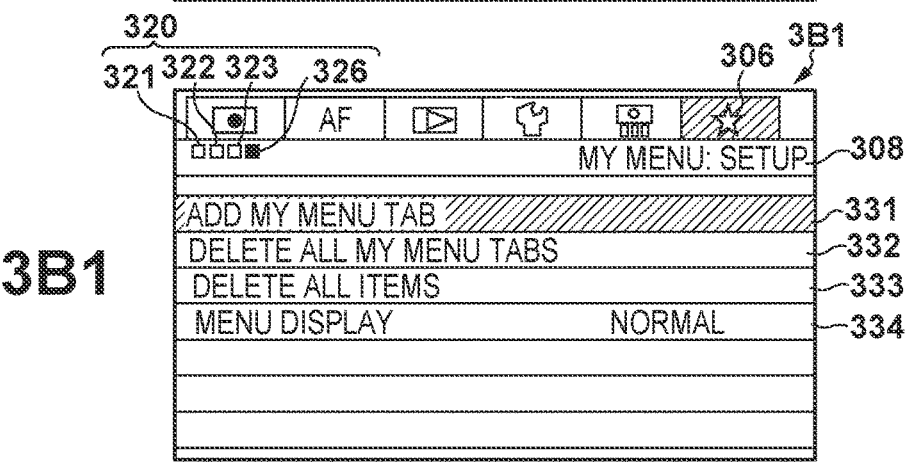
FIG. 3B1
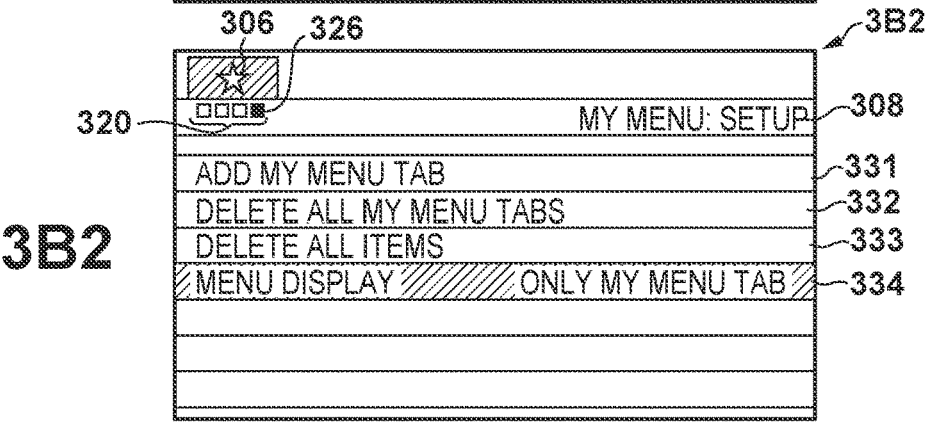
FIG. 3B2
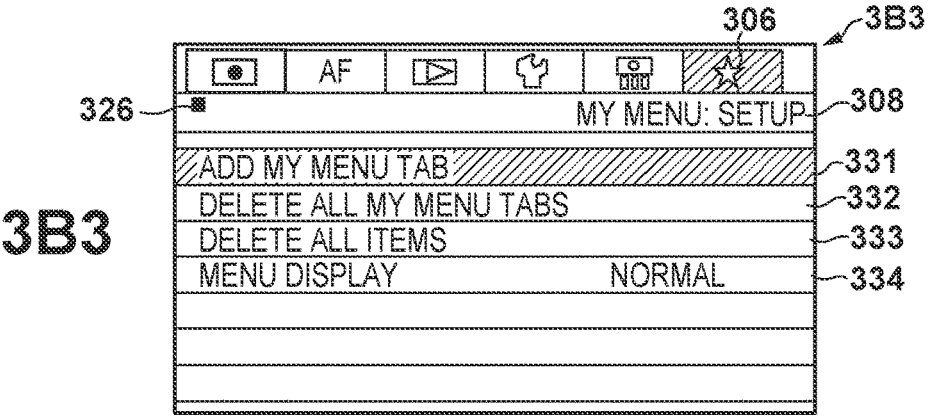
FIG. 3B3

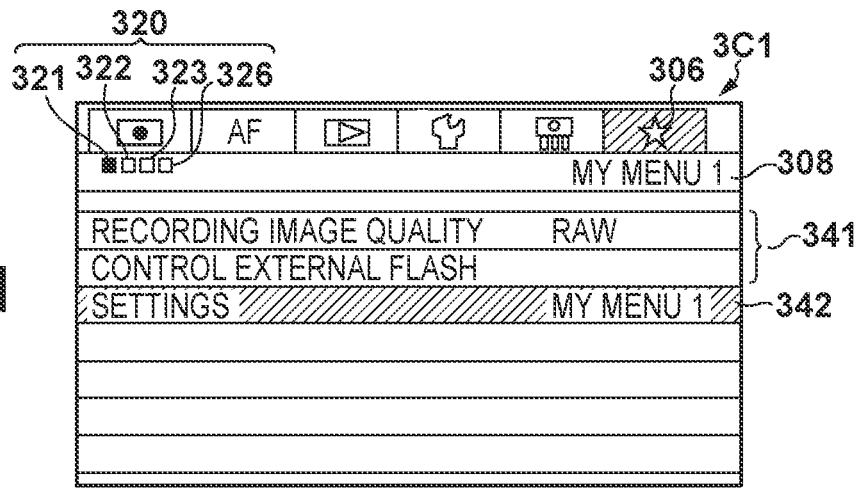
FIG. 3C1
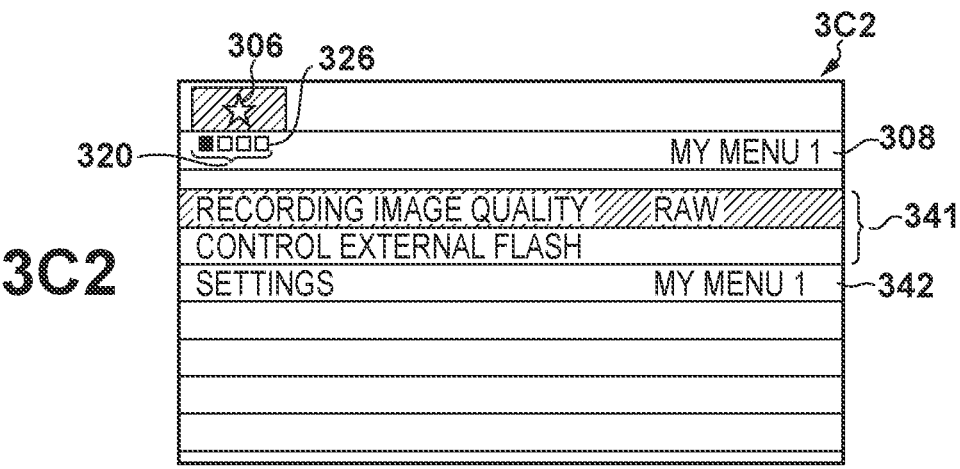
FIG. 3C2
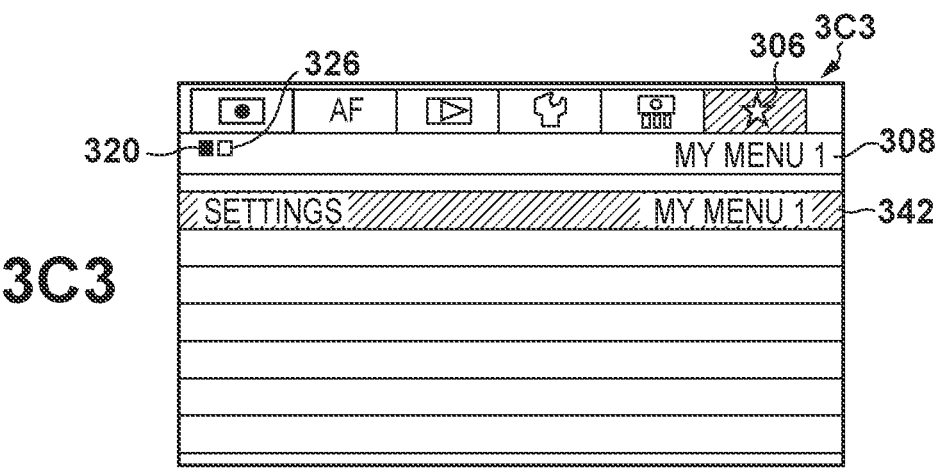
FIG. 3C3

F I G. 5A-1

■ FOCUS MOVE DESTINATIONS FOR CASE IN WHICH ITEM OTHER THAN "DISPLAY ONLY MY MENU" IS SET

| FOCUSED LARGE TAB | FOCUSED SMALL TAB | FOCUS MOVE DESTINATION | | | | | |
|---|---|---|---|---|---|---|---|
| | | QUICK BUTTON | | MAIN DIAL: CLOCKWISE, DIRECTIONAL BUTTONS: RIGHT | | MAIN DIAL: COUNTER CLOCKWISE, DIRECTIONAL BUTTONS: LEFT | |
| | | LARGE TAB | SMALL TAB | LARGE TAB | SMALL TAB | LARGE TAB | SMALL TAB |
| SHOOTING LARGE TAB | SHOOTING TAB 1 | AF LARGE TAB | AF TAB 1 | NO MOVEMENT | SHOOTING TAB 2 | MY MENU LARGE TAB | MY MENU SETTINGS TAB |
| | SHOOTING TAB 2 | | | | SHOOTING TAB 3 | NO MOVEMENT | SHOOTING TAB 1 |
| | SHOOTING TAB 3 | | | | SHOOTING TAB 4 | | SHOOTING TAB 2 |
| | SHOOTING TAB 4 | | | | SHOOTING TAB 5 | | SHOOTING TAB 3 |
| | SHOOTING TAB 5 | | | | SHOOTING TAB 6 | | SHOOTING TAB 4 |
| | SHOOTING TAB 6 | | | AF LARGE TAB | AF TAB 1 | | SHOOTING TAB 5 |
| AF LARGE TAB | AF TAB 1 | REPRODUCTION LARGE TAB | REPRODUCTION TAB 1 | NO MOVEMENT | AF TAB 2 | SHOOTING LARGE TAB | SHOOTING TAB 6 |
| | AF TAB 2 | | | | AF TAB 3 | NO MOVEMENT | AF TAB 1 |
| | AF TAB 3 | | | | AF TAB 4 | | AF TAB 2 |
| | AF TAB 4 | | | | AF TAB 5 | | AF TAB 3 |
| | AF TAB 5 | | | REPRODUCTION LARGE TAB | REPRODUCTION TAB 1 | | AF TAB 4 |
| REPRODUCTION LARGE TAB | REPRODUCTION TAB 1 | SETTINGS LARGE TAB | SETTINGS TAB 1 | NO MOVEMENT | REPRODUCTION TAB 2 | AF LARGE TAB | AF TAB 5 |
| | REPRODUCTION TAB 2 | | | | REPRODUCTION TAB 3 | NO MOVEMENT | REPRODUCTION TAB 1 |
| | REPRODUCTION TAB 3 | | | SETTINGS LARGE TAB | SETTINGS TAB 1 | | REPRODUCTION TAB 2 |

FIG. 5A-2

| | SETTINGS TAB 1 | CFn LARGE TAB | CFn TAB 1 | NO MOVEMENT | SETTINGS TAB 2 | REPRODUCTION LARGE TAB | REPRODUCTION TAB 3 |
|---|---|---|---|---|---|---|---|
| SETTINGS LARGE TAB | | | | | SETTINGS TAB 2 | NO MOVEMENT | SETTINGS TAB 1 |
| | SETTINGS TAB 2 | | | | SETTINGS TAB 3 | | SETTINGS TAB 2 |
| | SETTINGS TAB 3 | | | | SETTINGS TAB 4 | | SETTINGS TAB 3 |
| | SETTINGS TAB 4 | | | | CFn TAB 1 | | SETTINGS TAB 4 |
| CFn LARGE TAB | CFn TAB 1 | | | CFn LARGE TAB | CFn TAB 2 | SETTINGS LARGE TAB | CFn TAB 1 |
| | CFn TAB 2 | | | | CFn TAB 3 | | CFn TAB 2 |
| | CFn TAB 3 | | | | CFn TAB 4 | | CFn TAB 3 |
| | CFn TAB 4 | MY MENU LARGE TAB | ※2 MY MENU TAB 1 | NO MOVEMENT | ※3 MY MENU 1 TAB | CFn LARGE TAB | CFn TAB 4 |
| MY MENU LARGE TAB | ※1 MY MENU 1 TAB | | | MY MENU LARGE TAB | ※3 MY MENU 2 TAB | NO MOVEMENT | ※4 MY MENU 1 TAB |
| | ※1 MY MENU 2 TAB | | | | ※3 MY MENU 3 TAB | | ※4 MY MENU 2 TAB |
| | ※1 MY MENU 3 TAB | | | | ※3 MY MENU 4 TAB | | ※4 MY MENU 3 TAB |
| | ※1 MY MENU 4 TAB | | | | ※3 MY MENU 5 TAB | | ※4 MY MENU 4 TAB |
| | ※1 MY MENU 5 TAB | SHOOTING LARGE TAB | SHOOTING TAB 1 | SHOOTING LARGE TAB | MY MENU SETTINGS TAB | | ※4 MY MENU 5 TAB |
| | MY MENU SETTINGS TAB | | | | SHOOTING TAB 1 | | |

FIG. 5B

■ FOCUS MOVE DESTINATIONS FOR CASE IN WHICH "DISPLAY ONLY MY MENU" IS SET

| FOCUSED LARGE TAB | FOCUSED SMALL TAB | FOCUS MOVE DESTINATION | | | | | |
|---|---|---|---|---|---|---|---|
| | | QUICK BUTTON | | MAIN DIAL: CLOCKWISE, DIRECTIONAL BUTTONS: RIGHT | | MAIN DIAL: COUNTER CLOCKWISE, DIRECTIONAL BUTTONS: LEFT | |
| | | LARGE TAB | SMALL TAB | LARGE TAB | SMALL TAB | LARGE TAB | SMALL TAB |
| MY MENU LARGE TAB | ※1 MY MENU 1 TAB | NO MOVEMENT | NO MOVEMENT | NO MOVEMENT | ※3 MY MENU 2 TAB | NO MOVEMENT | MY MENU SETTINGS TAB |
| | ※1 MY MENU 2 TAB | | | | ※3 MY MENU 3 TAB | | ※4 MY MENU 1 TAB |
| | ※1 MY MENU 3 TAB | | | | ※3 MY MENU 4 TAB | | ※4 MY MENU 2 TAB |
| | ※1 MY MENU 4 TAB | | | | ※3 MY MENU 5 TAB | | ※4 MY MENU 3 TAB |
| | ※1 MY MENU 5 TAB | | | | MY MENU SETTINGS TAB | | ※4 MY MENU 4 TAB |
| | MY MENU SETTINGS TAB | | | | MY MENU 1 TAB | | ※4 MY MENU 5 TAB |

※1 THERE ARE CASES IN WHICH MY MENU 1 TAB TO MY MENU 5 TAB DO NOT EXIST
※2 MOVE TO LEFTMOST TAB AMONG SMALL TABS BELONGING TO MY MENU LARGE TAB
※3 WHEN NO MOVE DESTINATION EXISTS, MOVE TO SMALL TAB TO THE IMMEDIATE RIGHT
※4 WHEN NO MOVE DESTINATION EXISTS, MOVE TO SMALL TAB TO THE IMMEDIATE LEFT

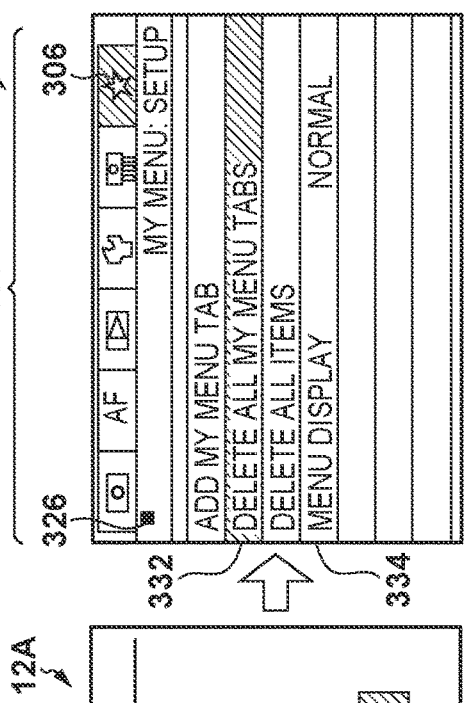
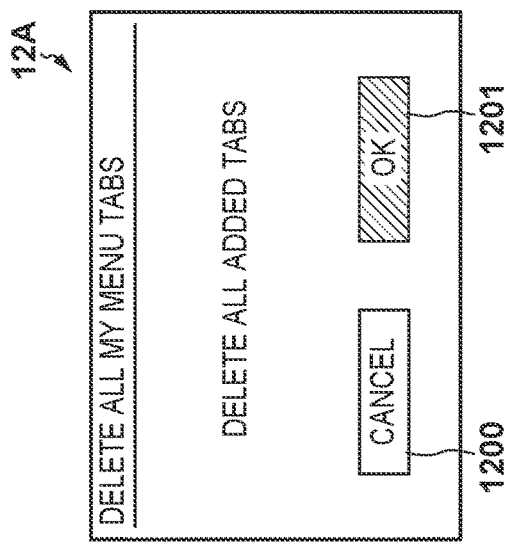
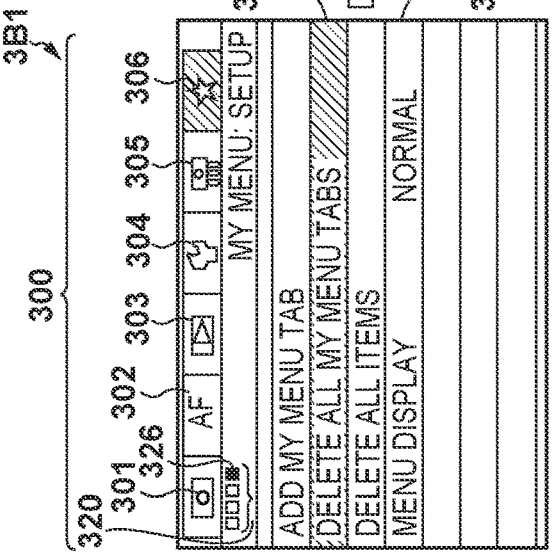
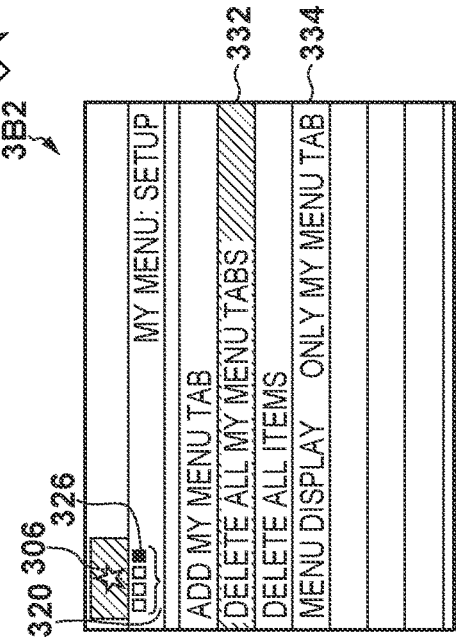

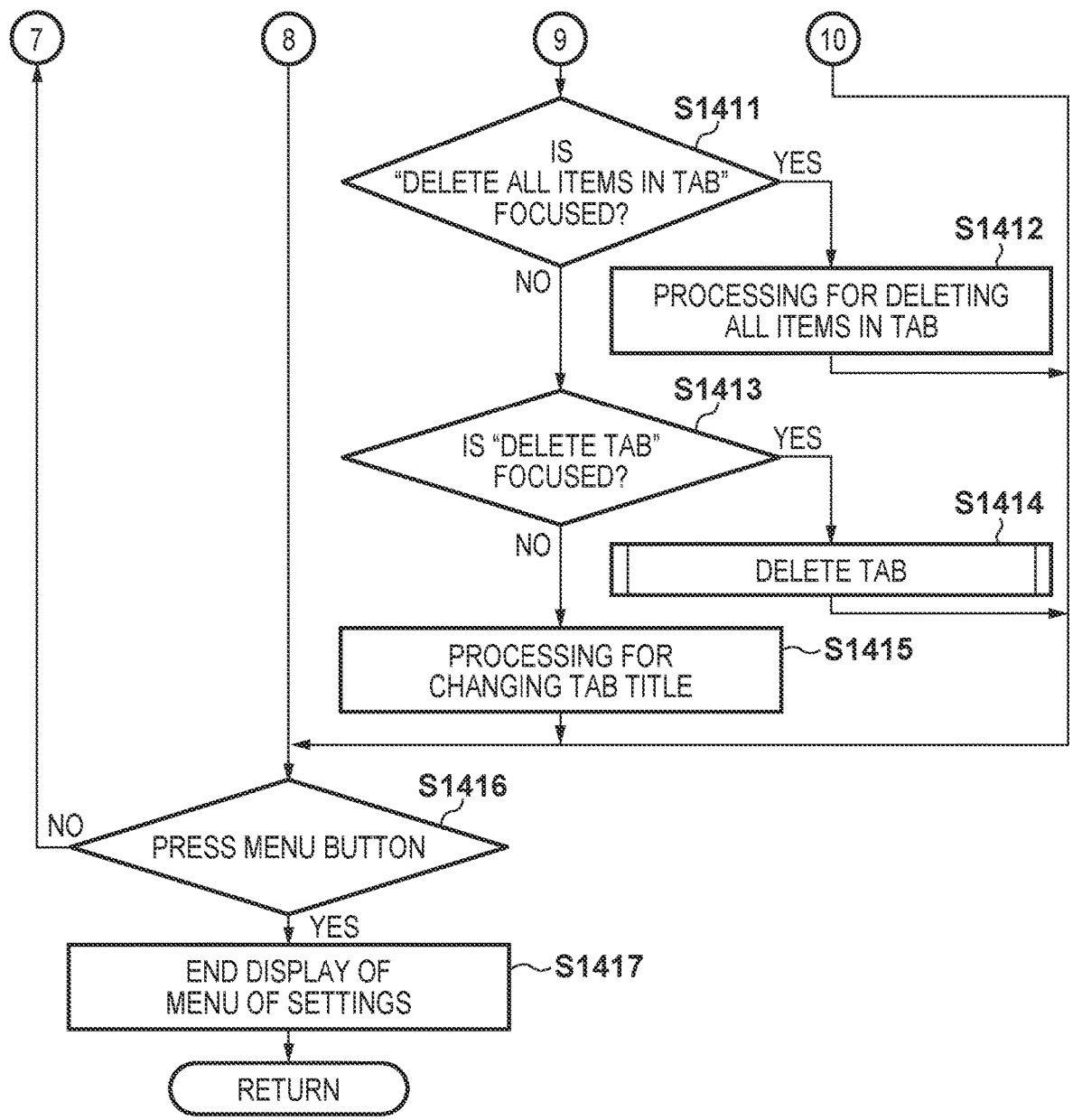

F I G. 15C 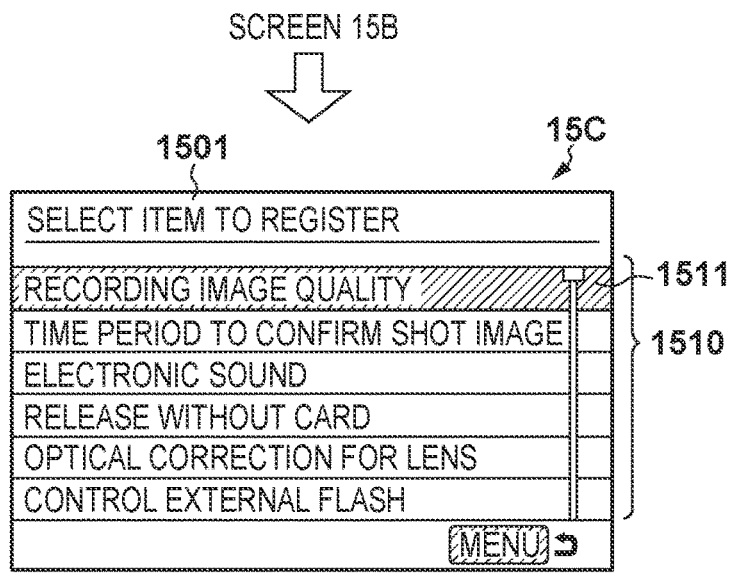
F I G. 15D 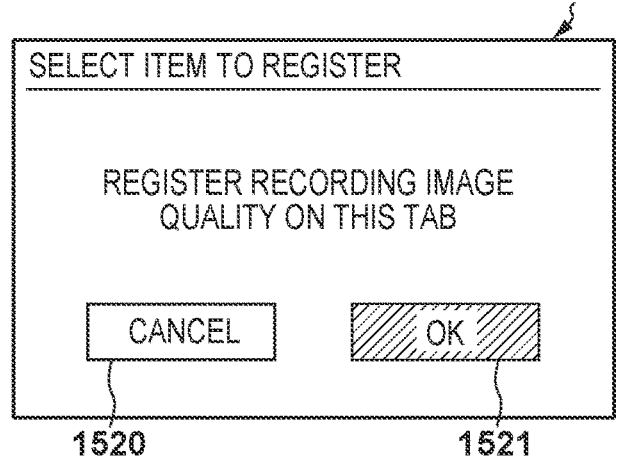
F I G. 15E 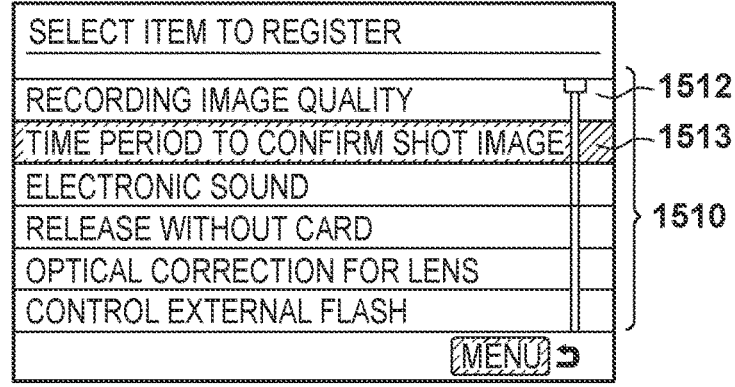

F I G. 15F
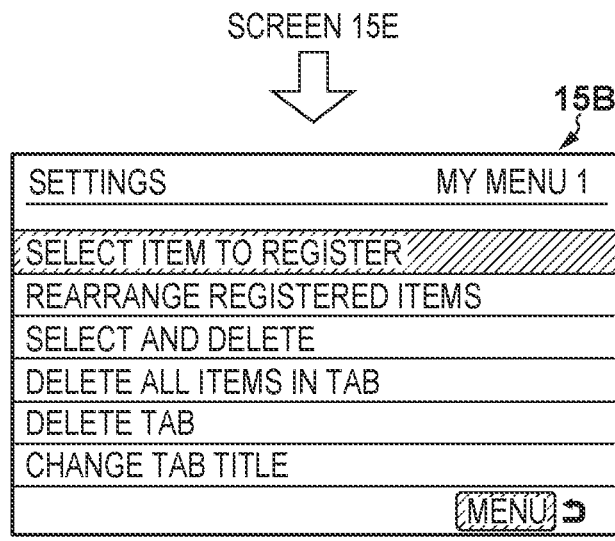
F I G. 15G
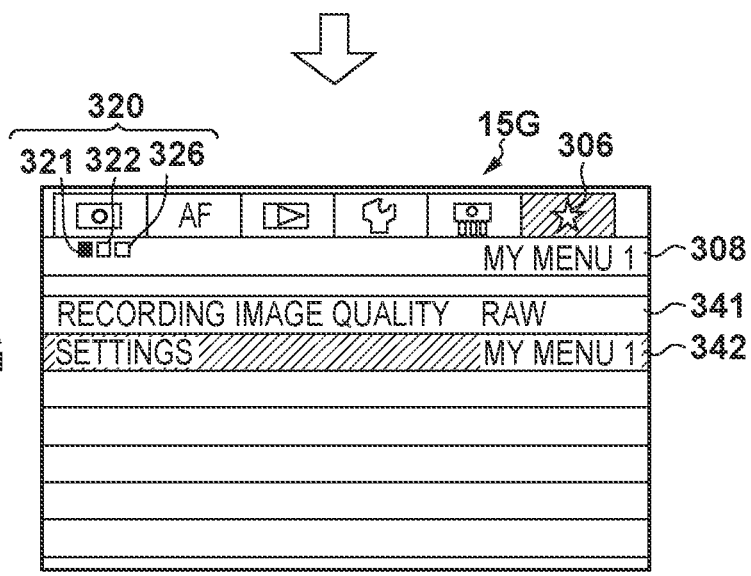

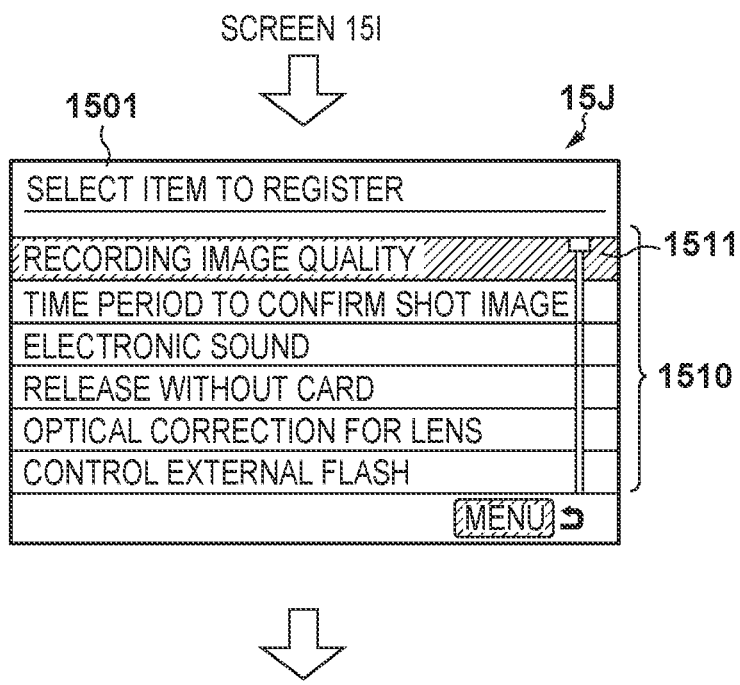

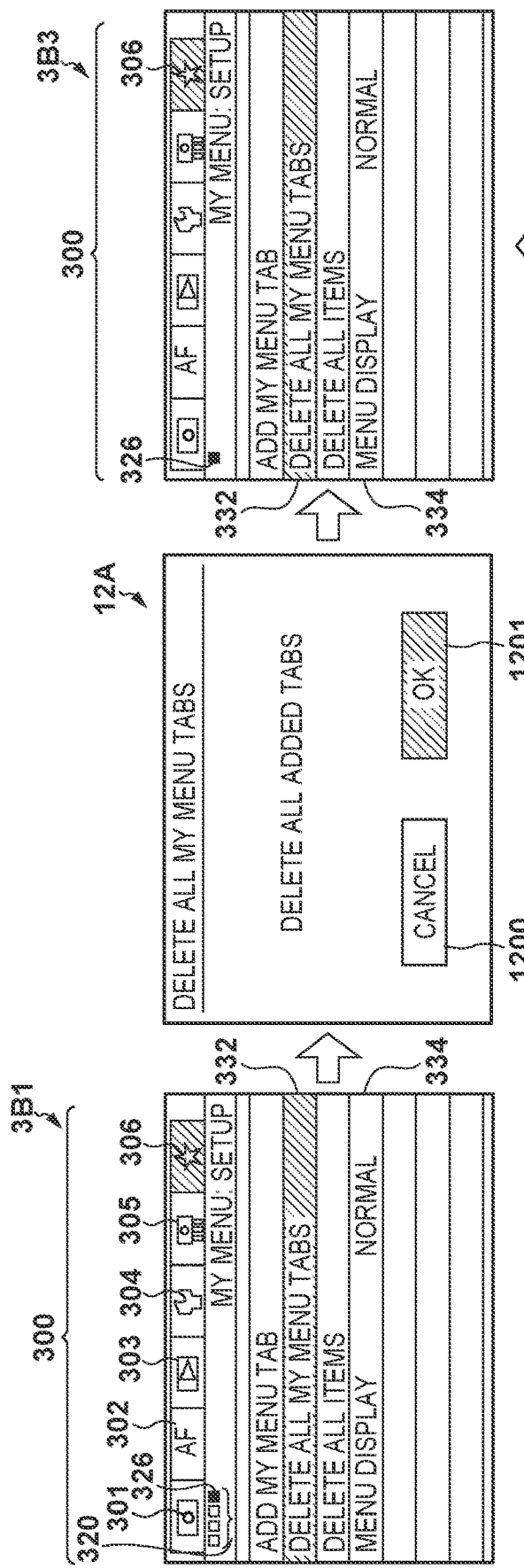

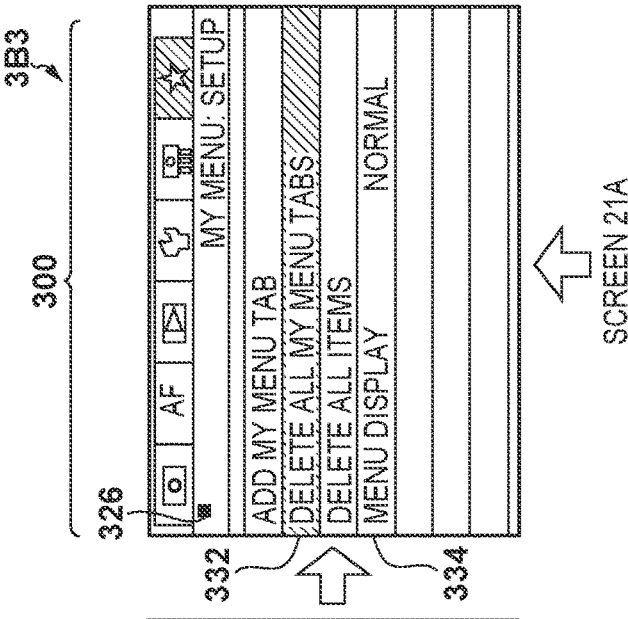
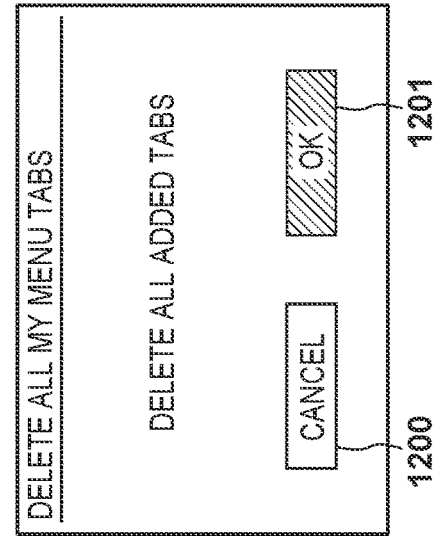
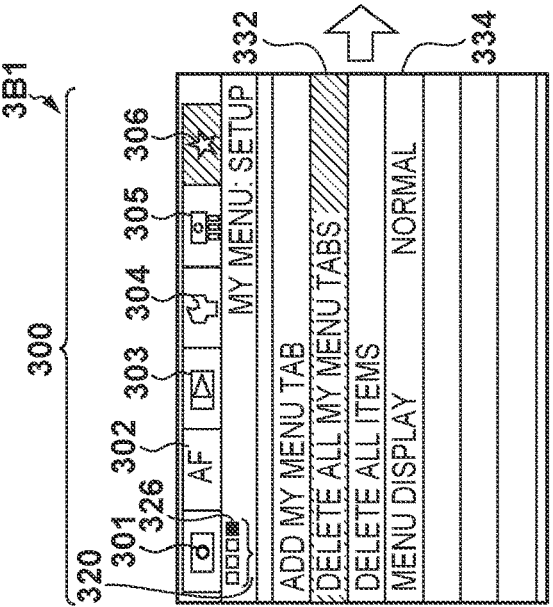

USER INTERFACE WITH A CUSTOMIZED MENU

CROSS-REFERENCE TO RELATED APPLICATIONS

This application is a divisional of application Ser. No. 14/851,984, filed Sep. 11, 2015 the entire disclosure of which is hereby incorporated by reference.

BACKGROUND OF THE INVENTION

Field of the Invention

The present invention relates an electronic apparatus and a control method thereof, particularly relates to a technique to control display of a menu screen for configuring the settings related to an electronic apparatus.

Description of the Related Art

In recent years, electronic apparatuses, such as digital cameras, have a known function of registering menu items that are frequently used by a user in one menu layer (my menu, custom menu) through a user operation, and enabling quick display of that menu layer simply by pressing a specific button (Japanese Patent Laid-Open No. 2010-11219, Japanese Patent Laid-Open No. 2006-99803).

Above-referenced Japanese Patent Laid-Open No. 2010-11219 does not disclose establishment of a plurality of independent custom menus. However, it is considered that a user uses different functions of an electronic apparatus under different situations and purposes of the use of the electronic apparatus. It would hence be convenient if the functions and settings to be used could be categorized according to the situations and purposes of the use of the electronic apparatus so as to establish separate custom menus in one-to-one correspondence with the categories. In this case, a plurality of my menus are established. In a case where a plurality of custom menus are established, there may be a setting item corresponding to one custom menu (e.g., an item for additionally registering a menu item in one custom menu). There may also be a setting item related to the entirety of the plurality of custom menus (e.g., an item for resetting all custom menus). In a case where these items have been prepared, if the user does not properly understand the range of the functions of these setting items during use, there is a possibility that the functions affect a range that is not intended by the user. For example, when the user intends to delete only a menu item registered in one custom menu, there is a possibility that the user mistakenly deletes all of the menu items registered in the plurality of custom menus, which gives rise to the need to redo a registration operation for the custom menus.

With regard to above-referenced Japanese Patent Laid-Open No. 2010-11219, assume the following case: after configuring the settings such that pressing of a specific button leads to display of a custom menu in which menu items frequently used by the user are registered, all menu items are deleted from the custom menu. In this case, it is presumed that the setting for displaying the custom menu upon pressing of the specific button is no longer necessary, and in order to remove this setting, the user needs to make a change to the settings.

In contrast, above-referenced Japanese Patent Laid-Open No. 2006-99803 fixedly places a function of displaying a custom menu at the topmost layer to "off (normal display state)" when all of the items registered in the custom menu are deleted. It is presumed here that, if all items in the custom menu are deleted while the function of displaying the custom menu at the topmost layer is in the "on" state, the display state of the custom menu will be changed to "off". However, as the "on"/"off" setting is displayed at an unnoticeable location, the user cannot promptly discern the setting being changed to "off". The user notices restoration to the "off" state (normal display state) only when the custom menu is not displayed in response to the user's operation of displaying the menu again.

On the other hand, in Japanese Patent Laid-Open No. 2013-097455, an item that is selected upon opening of a menu differs depending on whether a menu item is registered in a custom menu. Specifically, according to a method described therein, a menu is displayed with a selection of a predetermined menu item when a menu item is not registered in the custom menu, whereas a menu is displayed with a selection of a menu item for making a transition to the custom menu when a menu item is registered in the custom menu.

Some users may use different custom menus under different usage situations. In this case, it would be convenient if a plurality of menu items can be registered, by category, in a plurality of custom menus. However, if a plurality of custom menus are prepared from the beginning, there will be more items for displaying the custom menus. That is to say, for a user who does not need a plurality of custom menus, there will be a needlessly large number of options in one layer above a layer of the custom menus; this actually lowers usability.

SUMMARY OF THE INVENTION

The present invention has been made in consideration of at least one of the aforementioned problems, and provides an electronic apparatus that enables easy recognition of a target range of functions of menu items related to functions for a menu composed of menu items registered by a user.

The present invention has been made in consideration of at least one of the aforementioned problems, and provides an electronic apparatus that makes a display state of a menu screen easily discernible after deletion of a custom menu that is arbitrarily registered by a user.

The present invention has been made in consideration of at least one of the aforementioned problems, and provides an electronic apparatus that displays a menu with excellent usability, not only to a user who uses a custom menu composed of menu items registered by the user, but also to a user who does not use such a custom menu.

In order to solve the aforementioned problems, the present invention provides an electronic apparatus comprising: a registration unit configured to register a menu item in a menu having a hierarchical structure in accordance with a user operation, the menu being composed of a plurality of items; and a display control unit configured to (i) display a first-type item and a second-type item as options in a specific layer of the menu having the hierarchical structure, (ii) perform control to display a first menu item in a menu in a lower layer below a layer of the first-type item, the first menu item being used to register a menu item in the same menu using the registration unit, and to delete a menu item registered in the same menu by the registration unit, and (iii) display a second menu item in a menu in a lower layer below a layer of the second-type item, the second menu item being for deleting a menu item that is in the menu in the lower layer below the layer of the first-type item and that has been registered by the registration unit.

In order to solve the aforementioned problems, the present invention provides a control method of an electronic apparatus, comprising: a registration step of registering a menu item in a menu having a hierarchical structure in accordance with a user operation, the menu being composed of a plurality of items; and a display control step of (i) displaying a first-type item and a second-type item as options in a specific layer of the menu having the hierarchical structure, (ii) performing control to display a first menu item in a menu in a lower layer below the layer of the first-type item, the first menu item being used to register a menu item in the same menu in the registration step, and to delete a menu item registered in the same menu in the registration step, and (iii) displaying a second menu item in a menu in a lower layer below the layer of the second-type item, the second menu item being for deleting a menu item that is in the menu in the lower layer below the layer of the first-type item and that has been registered in the registration step.

In order to solve the aforementioned problems, the present invention provides an electronic apparatus comprising: a registration unit configured to register a menu item that has been designated by a user from among a plurality of menu items as an item of a customized menu; a setting unit configured to set one of a plurality of menu display modes including a first menu display mode and a second menu display mode when displaying a menu screen, the first menu display mode displaying a plurality of items including a first item and a second item in a selectable manner in a menu section in a first layer above a layer of the customized menu, the second menu display mode displaying the second item in the menu section without displaying the first item, the customized menu belonging to the second item as a lower layer therebelow; and a display control unit configured to perform control to, in a case where the customized menu is eliminated through processing for deleting the customized menu while the second menu display mode is set, switch from the second menu display mode to the first menu display mode and then display the menu screen.

In order to solve the aforementioned problems, the present invention provides an electronic apparatus comprising: a registration unit configured to register a menu item that has been designated by a user from among a plurality of menu items as an item of a customized menu; a setting unit configured to set one of a plurality of menu display modes including a first menu display mode and a third menu display mode, the first menu display mode starting display of a menu screen while an item selected last at a previous time, or a predetermined item other than a second item to which the customized menu belongs as a lower layer therebelow, is selected from among a plurality of items that are included in a menu section in a first layer above a layer of the customized menu and that include a first item and the second item, the third menu display mode starting display of the menu screen while the second item is selected from among the plurality of items in the menu section in the first layer; and a display control unit configured to perform control to, in a case where the customized menu is eliminated through processing for deleting the customized menu while the third menu display mode is set, switch from the third menu display mode to the first menu display mode and then display the menu screen.

In order to solve the aforementioned problems, the present invention provides a control method of an electronic apparatus, comprising: a registration step of registering a menu item that has been designated by a user from among a plurality of menu items as an item of a customized menu; a setting step of setting one of a plurality of menu display modes including a first menu display mode and a second menu display mode when displaying a menu screen, the first menu display mode displaying a plurality of items including a first item and a second item in a selectable manner in a menu section in a first layer above a layer of the customized menu, the second menu display mode displaying the second item in the menu section without displaying the first item, the customized menu belonging to the second item as a lower layer therebelow; and a display control step of performing control to, in a case where the customized menu is eliminated through processing for deleting the customized menu while the second menu display mode is set, switch from the second menu display mode to the first menu display mode and then display the menu screen.

In order to solve the aforementioned problems, the present invention provides a control method of an electronic apparatus, comprising: a registration step of registering a menu item that has been designated by a user from among a plurality of menu items as an item of a customized menu; a setting unit of setting one of a plurality of menu display modes including a first menu display mode and a third menu display mode, the first menu display mode starting display of a menu screen while an item selected last at a previous time, or a predetermined item other than a second item to which the customized menu belongs as a lower layer therebelow, is selected from among a plurality of items that are included in a menu section in a first layer above a layer of the customized menu and that include a first item and the second item, the third menu display mode starting display of the menu screen while the second item is selected from among the plurality of items in the menu section in the first layer; and a display control step of performing control to, in a case where the customized menu is eliminated through processing for deleting the customized menu while the third menu display mode is set, switch from the third menu display mode to the first menu display mode and then display the menu screen.

In order to solve the aforementioned problems, the present invention provides an electronic apparatus comprising: a registration unit configured to add a first-type item for displaying a first-type menu to a specific layer included in a menu having a hierarchical structure in accordance with a user operation, and to register a menu item in the first-type menu in accordance with the user operation; and a display control unit configured to perform control such that the first-type item is displayed as an option in the specific layer when the first-type item has been added by the registration unit, and such that the first-type item is not displayed as the option in the specific layer when the first-type item has not been added by the registration unit.

In order to solve the aforementioned problems, the present invention provides a control method of an electronic apparatus, comprising: a registration step of adding a first-type item for displaying a first-type menu to a specific layer included in a menu having a hierarchical structure in accordance with a user operation, and registering a menu item in the first-type menu in accordance with the user operation; and a display control step of performing control such that the first-type item is displayed as an option in the specific layer when the first-type item has been added in the registration step, and such that the first-type item is not displayed as the option in the specific layer when the first-type item has not been added in the registration step.

Further features of the present invention will become apparent from the following description of exemplary embodiments (with reference to the attached drawings).

BRIEF DESCRIPTION OF THE DRAWINGS

FIGS. 3A to 3C3 show transition of a menu screen of the digital camera.

FIGS. 5A-1 to 5B show focus move destinations on a menu screen.

FIGS. 12A to 12D show a transition of a menu screen in processing for deleting all my menu tabs.

FIGS. 14A and 14B are flowcharts showing processing for setting my menu.

FIGS. 15A to 15K show a transition of a menu screen in the processing for setting my menu, and menu items that are selectable in processing for selecting an item to register.

FIGS. 20A to 20G show a transition of a menu screen in the processing for deleting all my menu tabs.

FIGS. 21A to 21G show a transition of a menu screen in the processing for deleting all my menu tabs.

DESCRIPTION OF THE EMBODIMENTS

The following describes the details of an embodiment of the present invention with reference to the attached drawings.

<Apparatus Configuration>

Figure 1:
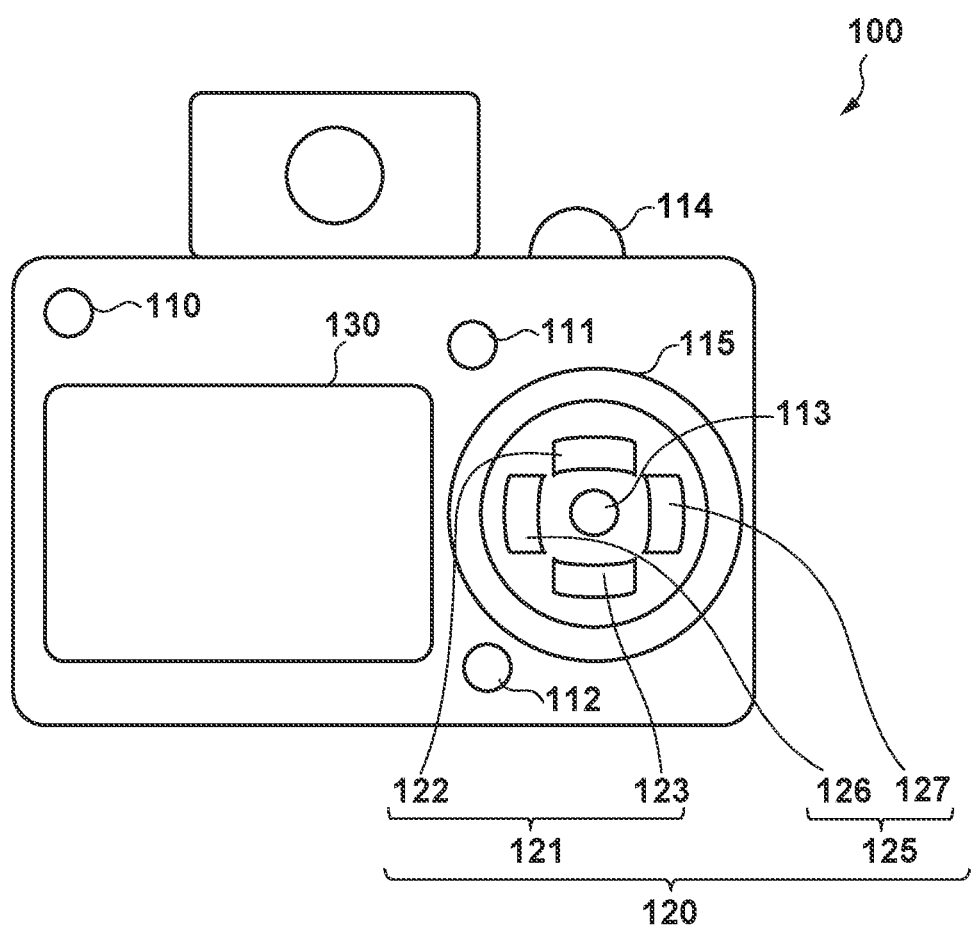
FIG. 1 shows an external appearance of a digital camera serving as an example of an electronic apparatus.
Figure 2:
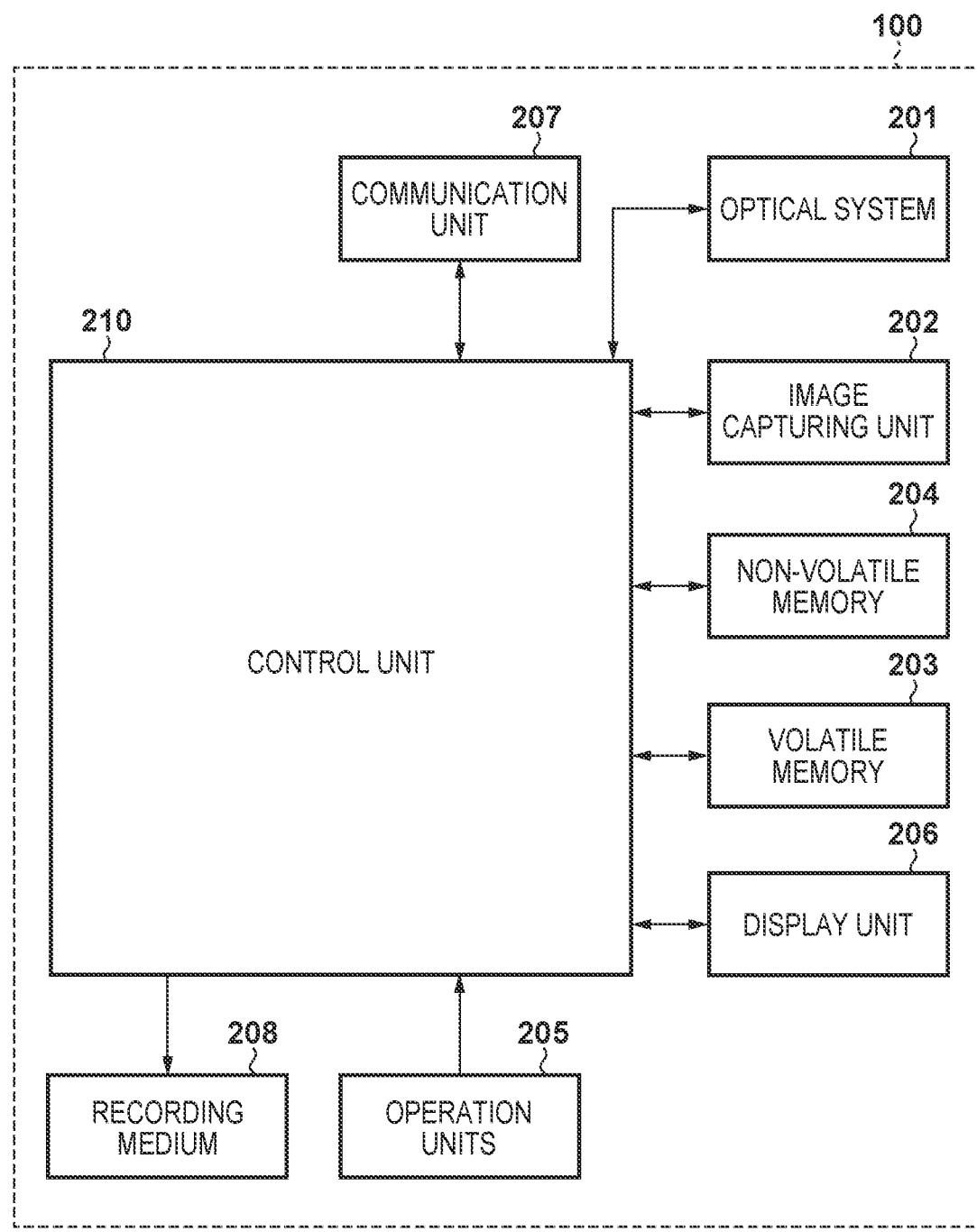
FIG. 2 is a block diagram of the digital camera.

With reference to FIGS. 1 and 2, a description is now given of the functions and external appearance of an electronic apparatus of an embodiment to which the present invention is applied (in the present embodiment, a digital camera, which is an image capturing apparatus, is used as an example).

FIG. 1 shows the external appearance of a back surface of a digital camera 100 according to the present embodiment.

A display monitor 101 is a display device, such as a liquid crystal display and an organic EL display, that displays images and various types of information.

A menu button 110 is used mainly to display a menu screen for configuring various types of settings of the digital camera 100.

A quick button 111 is used to activate functions set to a later-described my menu tab.

A reproduction button 112 is used mainly to display images on the display monitor 101.

A set button 113 is used mainly to confirm various types of settings, changes, and selections that have been made with respect to the menu screen.

A main dial 114 is used mainly to move focus on the menu screen to the left and right.

A sub dial 115 is used mainly to move focus on the menu screen upward and downward.

Directional buttons 120 are composed of up/down buttons 121 that are used mainly to move focus on the menu screen upward and downward, and left/right buttons 125 that are used to move focus on the menu screen to the left and right.

The up/down buttons 121 are composed of an up button 122 and a down button 123; the up button 122 is used mainly to move focus on the menu screen upward, and the down button 123 is used mainly to move focus on the menu screen downward.

The left/right buttons 125 are composed of a left button 126 and a right button 127; the left button 126 is used mainly to move focus on the menu screen to the left, and the right button 127 is used mainly to move focus on the menu screen to the right.

A user can configure various types of settings intuitively using the menu screen displayed on the display monitor 101 and operation members, such as the directional buttons 120 and the set button 113.

Note that a touchscreen capable of detecting contact on the display monitor 101 is included as one of later-described operation units 205. The touchscreen and the display monitor 101 can be configured integrally. In this way, a GUI can be configured that enables the user to feel as if he/she can directly operate a screen displayed on the display monitor 101.

Although not shown, the digital camera 100 according to the present embodiment includes the following components in addition to the aforementioned operation units: a shutter button with which the user issues a shooting instruction, a power switch for switching between on and off of the power of the camera, a mode changeover switch for switching between operation modes of the camera, etc.

The digital camera 100 according to the present embodiment also includes a memory slot for loading a recording medium, such as a memory card, a battery housing unit in which an alkaline battery, a lithium-ion battery, and the like are mounted, and a connector for connecting a communication cable according to USB and the like.

FIG. 2 shows an internal configuration of the digital camera 100 according to the present embodiment.

An optical system 201 is composed of a lens group including a zoom lens and a focus lens, and a shutter with a diaphragm function. An image capturing unit 202 is an image sensor composed of, for example, a CCD or a CMOS that converts an image of an object to an electrical signal.

The image capturing unit 202 includes an A/D converter that converts an analog signal output from the image sensor to a digital signal.

A volatile memory 203 is a temporary storage apparatus, such as a RAM, and stores still image data and moving image data (hereinafter, image data) output from the image capturing unit 202. The volatile memory 203 also stores various types of information, such as file system information and management information, in addition to image data, and plays a role as a working memory for a control unit 210 and the like. The volatile memory 203 further plays a role as a buffer memory while recording and reproducing images. Note that a working area for the control unit 210 is not limited to the volatile memory 203, and may be, for example, a later-described external hard disk and memory card.

A non-volatile memory 204 is an electrically erasable and recordable secondary storage apparatus, such as an EEPROM. The non-volatile memory 204 stores constants, programs, and the like for the operations of the control unit 210. The programs mentioned here denote programs for performing various types of flowcharts, which will be described later. The non-volatile memory 204 also stores files of shot images.

The control unit 210 includes a CPU, an input/output circuit, a timer circuit, and the like, and controls the operations of the entire apparatus by the CPU deploying the programs stored in the non-volatile memory 204 to the working area in the volatile memory 203 and executing the deployed programs.

The operation units 205 represent switches, arrow keys, the touchscreen, and the like that accept on/off of the power, start/stop of recording of moving images, shooting of still images, a zoom operation, switching between operation modes, and a user operation on a GUI screen and the like. The operation units 205 include the menu button 110, the quick button 111, the reproduction button 112, the set button 113, the main dial 114, the sub dial 115, and the directional buttons 120 shown in FIG. 1.

A display unit 206 displays through-the-lens images during shooting, reproduction of shot images, characters for interactive operations, and the like on the display monitor 101 shown in FIG. 1. The control unit 210 realizes an electronic viewfinder (EVF) function by controlling the display unit 206 to continuously display, on the display monitor 101, image data output from the image capturing unit 202 while updating the image data successively. Note that the display unit 206 turns on/off the electronic viewfinder (EVF) function in accordance with an instruction from a system control unit 350. Also note that the display unit 206 may be configured integrally with the digital camera 100, or may be an external apparatus connected to the digital camera 100.

A communication unit 207 is an interface for connecting to an external apparatus so as to enable wireless or wired communication therewith. The digital camera 100 according to the present embodiment can exchange data with the external apparatus via the communication unit 207. The external apparatus is, for example, a personal computer, a smartphone which is a kind of a mobile telephone, a tablet, and a printer; image data generated by the image capturing unit 202 can be transmitted to the external apparatus via the communication unit 207.

Image data output from the image capturing unit 202 can be recorded into a recording medium 208. The recording medium 208 may be configured in such a manner that it can be loaded into or removed from the digital camera 100, or may be built in the digital camera 100. That is to say, it is sufficient for the digital camera 100 to at least have a device for accessing the recording medium 208. Image data stored in the volatile memory 203 is recorded into the recording medium 208, and recorded image files and various types of information related to camera control are read therefrom. For example, a loadable and removable memory card is used as the recording medium 208.

Note that the entire apparatus may be controlled by a plurality of items of hardware sharing processing, instead of the control unit 210 controlling the entire apparatus.

Also note that in the digital camera 100 according to the present embodiment, when the menu button 110 included in the operation units 205 is pressed, the control unit 210 displays the menu screen on the display monitor 101 by controlling display on the display unit 206. On the menu screen, the following can be set and changed among others: later-described my menu, image shooting, the brightness of the display monitor, and selection of a language to be displayed.

<Menu Screen>

With reference to FIGS. 3A to 3C3, a description is now given of a menu screen that is displayed on the display monitor 101 upon pressing of the menu button 110, as well as a transition of the menu screen through operation on the operation units 205.

FIG. 3A exemplarily shows a menu screen 3A that is displayed on the display monitor 101 when the menu button 110 is pressed. As shown in the figure, large tabs 300 are arrayed in a crosswise direction in an upper part of the screen (a large tab with a black background is a focused large tab). Small tabs 307 represent a list of small tabs belonging to the focused large tab (a list of options in a small-tab layer), and a small tab with a black background is a focused small tab. Small tabs have their respective titles, and a small-tab title 308 shows a title of a small tab that is currently focused. Reference numeral 309 denotes a list of menu items belonging to the small tab that is currently focused (menu items of a menu in a lower layer (hierarchy) below the layers of the small tabs) (menu section), and a menu item with a black background is a menu item that is currently focused. Focus on the large tabs 300, focus on the small tabs 307, and focus on the menu items 309 can each be moved through operation on the operation units 205. The details of focus movement will be described later with reference to FIGS. 5A and 5B.

The large tabs 300 include, from the left in the figure, a shooting tab 301, an AF tab 302, a reproduction tab 303, a settings tab 304, a CFn tab 305, and a my menu tab 306. Each of the large tabs 301 to 306 has small tabs 307 belonging thereto, and different large tabs 301 to 306 have different numbers of small tabs 307. As focus on the large tabs 300 is moved, all small tabs 307 belonging to a focused one of the large tabs 301 to 306 are displayed. For example, the shooting tab 301 has six small tabs, the AF tab 302 has five small tabs, the reproduction tab 303 has three small tabs, the settings tab 304 has four small tabs, the CFn tab 305 has four small tabs, and the my menu tab 306 has up to six small tabs (one small tab in a default state). That is to say, each large tab corresponds to a plurality of small-tab categories. Each small tab 307 has menu items 309 belonging thereto; up to seven menu items belong to one small tab. As focus on the small tabs is moved, all menu items 309 belonging to a focused one of the small tabs are displayed.

The shooting tab 301 includes small tabs (third-type items) for displaying menus that have menu items for configuring the settings related to shooting (third-type menus). The AF tab 302 includes small tabs (third-type items) for displaying menus that have menu items for configuring the settings related to shooting, mainly the autofocus settings (third-type menus). The reproduction tab 303 includes small tabs (third-type items) for displaying menus that have menu items related to reproduction of shot images (third-type menus). The settings tab 304 includes small tabs (third-type items) for displaying menus that have menu items for configuring the camera settings, the settings for connection with peripheral apparatuses, and the like (third-type menus). The CFn tab 305 includes small tabs (third-type items) for displaying menus that have menu items for configuring the detailed settings of shooting functions (third-type menus). The my menu tab 306 includes my menu small tabs 320 (first-type items) for displaying menus that have menu items registered by the user (first-type menus). It also includes a my menu settings tab 326 (second-type item) for displaying a menu that have menu items for configuring the settings related to the my menu small tabs (second-type menu). The my menu tab 306 has a function that enables the user to arbitrarily designate and register the menu items 309 included in the large tabs other than the my menu tab. The number of the menu items 309 is considerably large due to the increasingly advanced camera functions; therefore, by registering menu items that are frequently used by the user in the my menu tab 306, a desired menu item can be quickly accessed simply by pressing the quick button 111.

FIGS. 3B1, 3B2, 3B3, 3C1, 3C2, and 3C3 exemplarily show menu screens 3B1, 3B2, 3B3, 3C1, 3C2, and 3C3, respectively, in a state where the my menu tab 306 is focused. The my menu tab 306, which is a large tab, includes the my menu small tabs 320 (first-type items) and the my menu settings tab 326 (second-type item) as small tabs in a lower layer therebelow. The my menu small tabs 320 are small tabs in which menu items 341 that have been arbitrarily selected by the user (items to register) can be additionally registered, and the number of registered (added) my menu small tabs can be greater than one. For example, on the screen 3B1, three small tabs—my menu 1 tab 321, my menu 2 tab 322, and my menu 3 tab 323—are generally indicated as the my menu small tabs 320; however, as the my menu small tabs 320 can be added, the number thereof may be any. In the present embodiment, there are up to five my menu small tabs 320. The my menu settings tab 326 is a small tab that has menu items 331 to 334 related to the settings of the my menu tab 306. Upon selection of the my menu tab 306, the my menu small tabs 320 and the my menu settings tab 326 are displayed on the same screen (in the same row). Note that in a state where the my menu tab 306 is selected, small tabs belonging to other large tabs, such as small tabs belonging to the shooting tab 301, are not displayed. However, as will be described later, even in a state where one of the my menu small tabs 320 and the my menu settings tab 326 is selected while the my menu tab 306 is selected, a small tab belonging to another large tab can be selected (focused) by continuously switching between selected small tabs. When a small tab belonging to another large tab is selected, a selected (focused) large tab is changed from the my menu tab 306 to another large tab.

Note that in the present embodiment, there are up to five my menu small tabs 320 because the number of large tabs 301 to 305 is five. By enabling addition of my menu small tabs 320 that correspond in number to the large tabs, it is possible to use the my menu 1 tab 321 as a virtual shooting tab 301, the my menu 2 tab 322 as a virtual AF tab 302, and so on.

The my menu small tabs 320 and the my menu settings tab 326 may have different display appearances. For example, the color of the small-tab title 308 may be changed, or the color of characters of the menu items 341, 342, and 331 to 334 may be changed. By using different display appearances, the user can easily identify the my menu small tabs 320 and the my menu settings tab 326. Note that menu items cannot be additionally registered on the my menu settings tab 326.

FIGS. 3B1, 3B2, and 3B3 exemplarily show the menu screens 3B1, 3B2, and 3B3, respectively, in a state where the my menu settings tab 326 is focused.

The screen 3B3 pertains to an example case in which the my menu settings tab 326 is the only small tab 307 belonging to the my menu tab 306. In a default state (at the time of default settings), the my menu settings tab 326 is the only small tab 307 belonging to the my menu tab 306.

In order to display the my menu small tabs 320, it is necessary to additionally register my menu tabs via "add my menu tab" 331 on the my menu settings tab 326.

A menu (second-type menu) in a lower layer below the layer of the my menu settings tab 326 (second-type item) has the following menu items: "add my menu tab" 331, "delete all my menu tabs" 332, "delete all items" 333, and "menu display" 334. "Add my menu tab" 331 is a menu item for performing a function of adding a my menu small tab 320. "Delete all my menu tabs" 332 is a menu item for performing a function of deleting all of the my menu small tabs that have been added. "Delete all items" 333 (first menu item) is a menu item for performing a function of deleting all of the menu items registered on the my menu small tabs 320. "Menu display" 334 is a menu item for setting a menu display mode. The details of the functions of the menu items 331 to 334 will be described later. In the present embodiment, the my menu settings tab 326 is always displayed at the rightmost location in the array of small tabs, regardless of the number of my menu small tabs.

FIGS. 3C1, 3C2, and 3C3 exemplarily show the screens 3C1, 3C2, and 3C3, respectively, in a state where a my menu small tab 320 is focused.

A menu (first-type menu) in a lower layer below the layer of the my menu small tabs 320 has the following menu items: "settings" 342 (second menu item), and my menu items (customized menu items, registered items) 341 that have been customized by the user. "Settings" 342 is for registering and deleting my menu items 341, and changing the tab title 308, with respect to the corresponding small tab. The details of the functions of "settings" 342 will be described later.

FIG. 3C3 exemplarily depicts a state that immediately follows the selection of "add my menu tab" 331 on the screen 3B3; in a state where no my menu item 341 is registered, only "settings" 342 is displayed.

Note that the upper limit of the number of my menu items 341 that can be registered on a my menu small tab 320 is restricted to the number of menu items that can be displayed on one screen without scrolling (in the present embodiment, six). In this way, the user can view all of the registered my menu items 341 simply by sequentially selecting the small tabs included among the my menu small tabs 320 through operation on the main dial 114; this makes it easy to look for a desired my menu.

The upper limit of the number of my menu items 341 that can be registered on a my menu small tab 320 may be removed, that is to say, may be unrestricted. In this case, as many my menu items 341 as desired are registered on one of the my menu small tabs 320 (e.g., my menu 1 tab 321). The user can make a selection by vertically scrolling the menu items 341 through operation on the sub dial 115.

FIGS. 3B2 and 3C2 exemplarily show the screens 3B2 and 3C2, respectively, in a state where "only my menu tab" is set under "menu display" 334. When "only my menu tab"

is set under "menu display" 334, the large tabs 301 to 305 other than the my menu tab 306 are not displayed.

FIG. 3B2 exemplarily shows the screen 3B2 in a state where small-tab focus is on the my menu settings tab 326.

FIG. 3C2 exemplarily shows the screen 3C2 in a state where small-tab focus is on a my menu small tab 320. The details of the functions of "menu display" 334 will be described later with reference to FIGS. 10A to 10C and 11.

As described above, a menu screen of the present embodiment has a hierarchical structure in which the large tabs 301 to 306 are placed in the topmost layer, the small tabs 307, 320, and 326 belong to the corresponding large tabs, and the menu items 309, 331 to 334, 341, and 342 belong to the corresponding small tabs. That is to say, in the hierarchical structure, a plurality of small tabs serve as an upper layer (hierarchy) above a layer of the menu item group 309, and a plurality of large tabs serve as an upper layer above a layer of the plurality of small tabs.

<Movement of Focus>

With reference to FIGS. 4, 5A, and 5B, a description is now given of processing for moving focus on the large tabs 300, small tabs 307, and menu items 309 on a menu screen of the present embodiment.

Figure 4A:
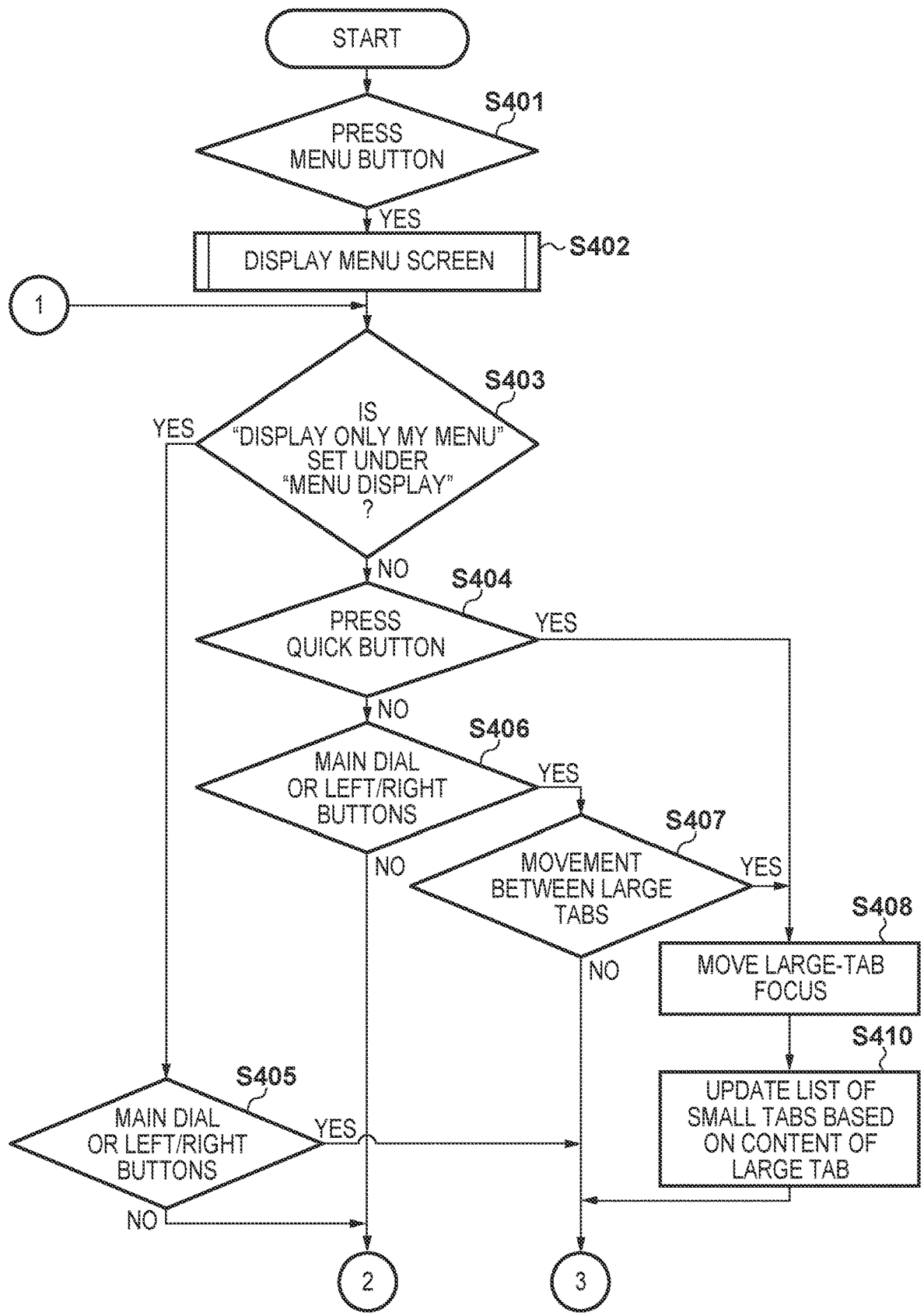
FIGS. 4A and 4B are flowcharts showing processing for displaying a menu screen.
Figure 4B:
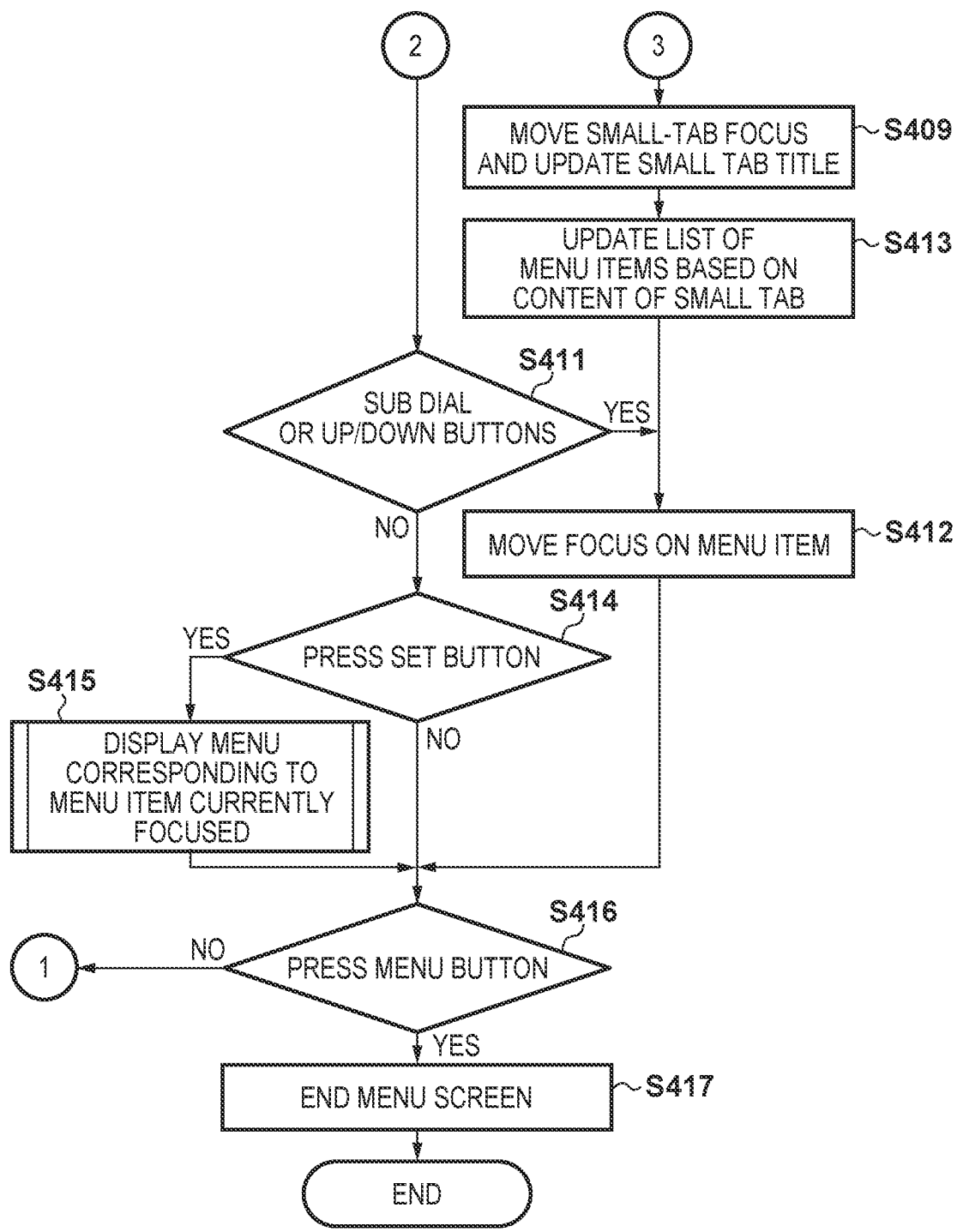

FIGS. 4A and 4B show processing for a menu screen performed when the menu button 110 is pressed.

Note that the processing of FIGS. 4A and 4B are realized by the control unit 210 executing a software program stored in the non-volatile memory 204 after the software program is read to the volatile memory 203.

When an instruction for starting display of a menu screen is issued by the user pressing the menu button 110, the control unit 210 displays a default menu screen on the display monitor 101.

In step S401, the control unit 210 waits for pressing of the menu button 110, and proceeds to step S402 if it is pressed.

In step S402, the control unit 210 displays one of the menu screens shown in FIGS. 3A to 3C3 on the display monitor 101. The details of this processing for displaying a menu screen will be described later with reference to FIG. 11.

In step S403, the control unit 210 determines whether "only my menu tab" is set under "menu display" 334, as on the screen 3B2 of FIG. 3B2; it proceeds to step S405 if "only my menu tab" is set, and proceeds to step S404 otherwise.

If it proceeds to step S404, a menu screen other than the menu screen 3B2 of FIG. 3B2 and the menu screen 3C2 of FIG. 3C2 is displayed; if it proceeds to step S405, the menu screen 3B2 of FIG. 3B2 or the menu screen 3C2 of FIG. 3C2 is displayed.

In step S404, the control unit 210 determines whether the quick button 111 is pressed; if pressed, it proceeds to step S408, and if not pressed, it proceeds to step S406.

The control unit 210 moves focus to the next large tab in accordance with a current large-tab focus position in step S408, and then proceeds to step S410.

FIGS. 5A and 5B show a relationship between the types of focused tabs and the types of tabs serving as focus move destinations according to operation on the operation units 205. FIGS. 5A-1 and 5A-2 show focus move destinations for a case in which an item other than "display only my menu tab" is set under "menu display" 334. For example, if the quick button 111 is pressed in a state where the shooting tab 301 and its shooting small tab 1 are focused, the next focus move destinations for the large and small tabs are the AF tab and the AF tab 1, respectively, according to FIGS. 5A-1 and 5A-2. Note that the numbers of small tabs are arrayed from left in ascending order.

In step S408, the control unit 210 moves focus from the shooting tab 301 to the AF tab 302. As shown in FIGS. 5A-1 and 5A-2, pressing of the quick button 111 causes movement between large tabs, and always moves a small-tab focus position to the leftmost small tab (top tab) belonging to a large tab. Note that after the update processing in step S410, the control unit 210 moves small-tab focus in step S409; here, it also stores, into the volatile memory 203, a small-tab focus move destination that has been decided on according to FIGS. 5A-1 and 5A-2.

The control unit 210 displays a list of small tabs belonging to a large tab serving as a move destination as the small tabs 307 in step S410, and then proceeds to step S409.

In step S406, the control unit 210 determines whether the main dial 114 or the left/right buttons 125 have been operated; if operated, it proceeds to step S407, and if not operated, it proceeds to step S411.

In step S407, the control unit 210 decides on the focus move destinations for the large and small tabs according to FIGS. 5A and 5B based on a current small-tab focus position, and stores the move destinations into the volatile memory 203. In step S407, the control unit 210 also determines whether there has been movement between large tabs; it proceeds to step S408 if there has been movement between large tabs, and proceeds to step S409 if there has been no movement between large tabs.

In step S405, the control unit 210 determines whether the main dial 114 or the left/right buttons 125 have been operated; if operated, it proceeds to step S409, and if not operated, it proceeds to step S411.

FIG. 5B shows focus move destinations for a case in which "display only my menu tab" is set under "menu display" 334.

In step S405, as the large tabs 301 to 305 other than the my menu tab 306 are not displayed, there is no movement between large tabs, and only small-tab focus is moved to a focus move destination corresponding to operation on the operation units 205 according to FIG. 5B.

In step S409, the control unit 210 moves small-tab focus. Whether processing has been performed through step S407 or step S410, a small-tab focus move destination is stored in the volatile memory 203, and the control unit 210 moves small-tab focus based on the stored focus move destination. In moving the focus, the control unit 210 stores, into the volatile memory 203, the small-tab focus position serving as the move destination as a current focus position. In this case, the control unit 210 also updates the displayed small-tab title 308 of FIGS. 3A to 3C3 to the title of the small tab serving as the focus move destination, and then proceeds to step S413.

Note that the control unit 210 writes the current small-tab focus position stored in the volatile memory 203 to the non-volatile memory 204 when the power is turned off, and reads the same from the non-volatile memory 204 to the volatile memory 203 when the power is turned on again.

The control unit 210 displays menu items 309 belonging to the small tab serving as the move destination on the display monitor 101 in step S413, and then proceeds to step S412.

In step S411, the control unit 210 determines whether the sub dial 115 or the up/down buttons 121 have been operated; if operated, it proceeds to step S412, and if not operated, it proceeds to step S414.

In step S412 that follows step S411, the control unit 210 moves focus on a menu item 309 downward if the sub dial 115 is operated clockwise or the down button 123 is pressed. In a case where the bottommost menu item is focused, focus is moved to the topmost menu item. If the sub dial 115 is operated counterclockwise or the up button 122 is pressed, the control unit 210 moves focus on a menu item 309 upward. In a case where the topmost menu item is focused, focus is moved to the bottommost menu item. In this processing, the control unit 210 stores a focus position serving as a move destination into the volatile memory 203 for each small tab. On the other hand, in step S412 that follows step S413, the control unit 210 moves focus on a menu item based on the focus positions that are stored in the volatile memory 203 in one-to-one correspondence with the small tabs. Note that the control unit 210 writes the focus positions on menu items, which are in one-to-one correspondence with the small tabs, to the non-volatile memory 204 when the power of the camera is turned off, and reads the same from the non-volatile memory 204 to the volatile memory 203 when the power of the camera is turned on.

In step S414, the control unit 210 determines whether the set button 113 is pressed; if pressed, it proceeds to step S415, and if not pressed, it proceeds to step S416.

In step S415, the control unit 210 performs display corresponding to a menu item 341 or 342 that is currently focused (FIG. 3C2). The details of processing in step S414 will be described later with reference to FIG. 6.

In step S416, the control unit 210 determines whether the menu button 110 is pressed; if pressed, it proceeds to step S417, and if not pressed, it returns to step S403.

In step S417, the control unit 210 ends display of the menu screen with a focus position on a small tab 307 and a focus position on a menu item 309 stored in the volatile memory 203. In this way, when a menu screen is displayed next in step S402, focus can be moved to previous focus positions in accordance with the setting of "menu display" 334.

Because the number of small tabs is large as shown in FIGS. 5A and 5B, moving small-tab focus using the left/right buttons 125 and the main dial 114 requires effort and time during operation. In view of this, in order to move between small tabs at the lowest possible frequency and reduce effort during operation, only the my menu small tabs 320 that are currently registered are displayed. For example, provided that up to five my menu small tabs 320 can be registered, a user who does not use my menu would be annoyed if all of them are always displayed. A default value of the number of my menu small tabs that are currently registered is zero.

<Functions of My Menu (Settings) Tab>

With reference to FIGS. 3A to 3C3, a description is now given of the functions of the my menu settings tab 326 and the my menu small tabs 320 on a menu screen of the present embodiment.

The functions of the my menu settings tab 326 (menu items included in a menu displayed on the my menu settings tab 326) include "add my menu tab" 331, "delete all my menu tabs" 332, "delete all items" 333, and "menu display" 334.

"Add my menu tab" 331 is a menu item for performing a function of increasing the number of registered my menu small tabs 320 stored in the non-volatile memory 204 one by one. A screen transition upon selection of "add my menu tab" 331 will be described later with reference to FIGS. 8A to 8E.

"Delete all my menu tabs" 332 is a menu item for performing a function of making the number of registered my menu small tabs 320 stored in the non-volatile memory 204 zero. The details of the functions of "delete all my menu tabs" 332 will be described later with reference to FIGS. 12A to 12D and 13.

"Delete all items" 333 is a menu item for performing a function of deleting all of the my menu items 341 registered on each of the my menu small tabs 320 stored in the non-volatile memory 204. A screen transition upon selection of "delete all items" 333 will be described later with reference to FIGS. 9A to 9E.

Figure 10A:
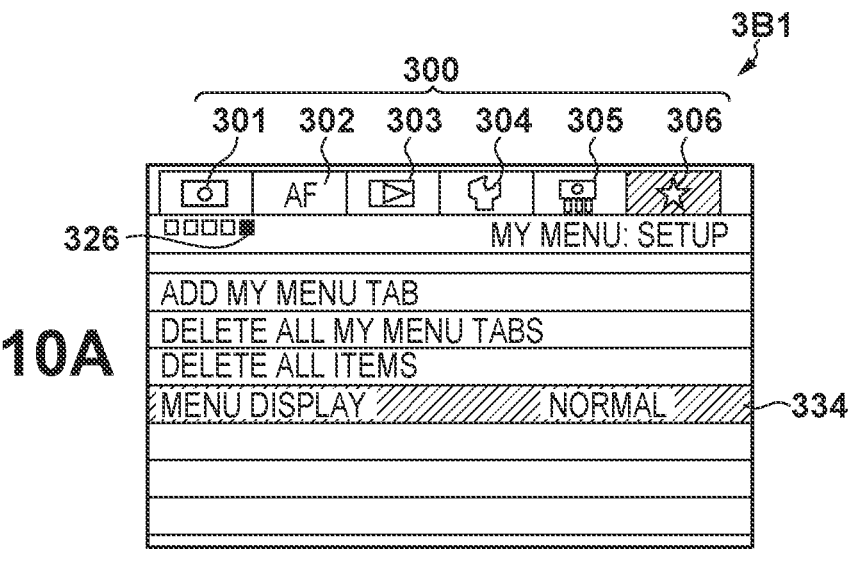
FIGS. 10A to 10C show a transition of a menu screen in setting menu display.
Figure 10B:
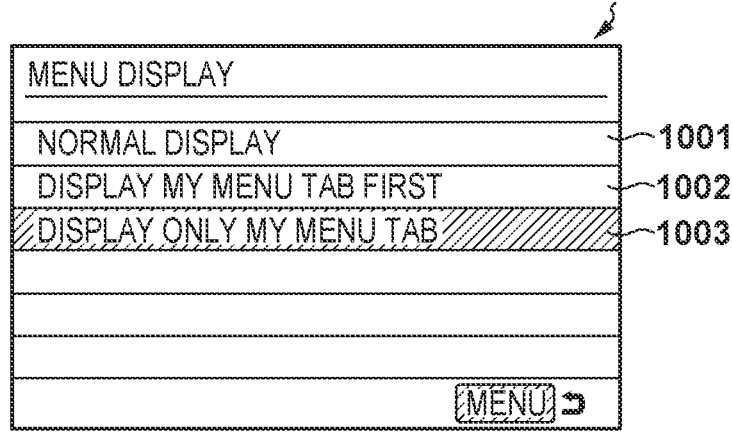
Figure 10C:
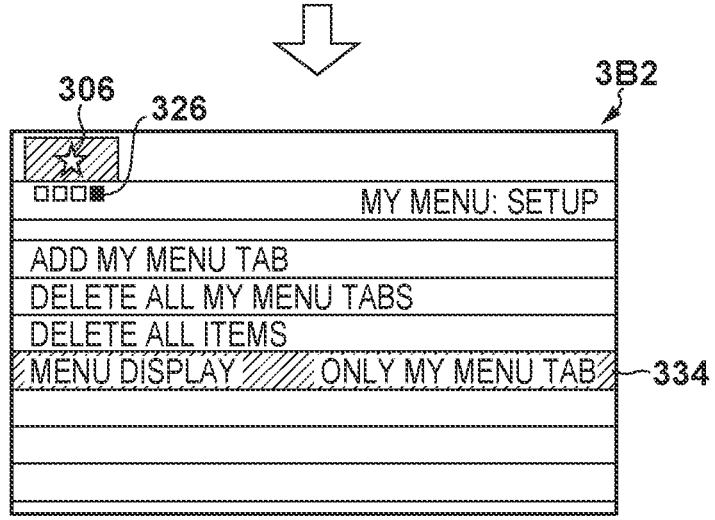

"Menu display" 334 is a menu item for setting one of "normal display" 1001, "display my menu tab first" 1002, and "display only my menu tab" 1003 under "menu display" (see FIGS. 10A to 10C). The details of the functions of "menu display" 334 will be described later with reference to FIGS. 10A to 10C and 11.

The functions of the my menu small tabs 320 include performing the registered my menu items 341 and "settings" 342.

Performing the registered my menu items 341 means to configure the settings of and change the camera functions through the user's operation on the operation units 205, which are similar to processing of a transition from the normal menu items 309.

"Settings" 342 is a menu item for performing various functions within a menu corresponding to the my menu small tab 320 being selected, and selection of "settings" 342 leads to display of a lower-layer menu having the following menu items: "select item to register" 1501, "rearrange registered items" 1502, "select and delete" 1502, "delete all items in tab" 1504, "delete tab" 1505, and "change tab title" 1506 (see a screen 15B of FIG. 15B). Note that the details of processing for "select item to register" 1501 will be described later with reference to FIGS. 15A to 15K and 16, and the details of the functions of "delete tab" 1505 will be described later with reference to FIGS. 17A to 17H and 18.

As described above, the my menu settings tab 326 and the my menu small tabs 320 are independently provided as small tabs belonging to the my menu tab 306. That is to say, the setting functions related to the entirety of my menu, such as "delete all my menu tabs" 332 and "delete all items" 333, are allocated independently of the my menu small tabs 320. This makes it easy for the user to recognize the my menu settings tab 326 as a function of configuring the settings related to the entirety of my menu.

In contrast, functions that are effective only for a my menu small tab 320 being selected, such as "select item to register" 1501, "select and delete" 1503, and "delete all items in tab" 1504, are allocated to "settings" 342 on each my menu small tab 320. This makes it easy for the user to recognize that they are effective only for a my menu small tab 320 being selected.

Figure 9A:
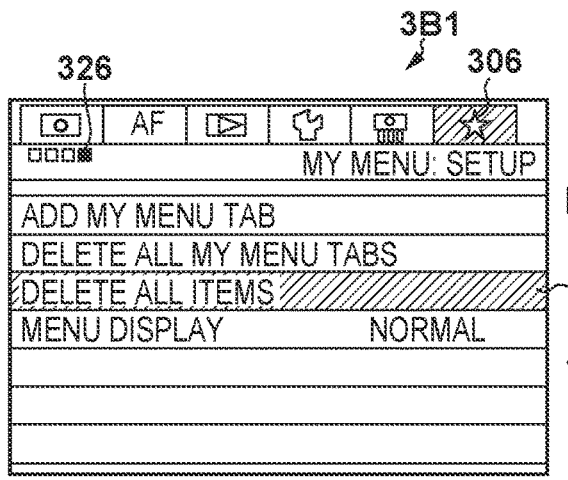
FIGS. 9A to 9E show a transition of a menu screen in processing for deleting all items.
Figure 9B:
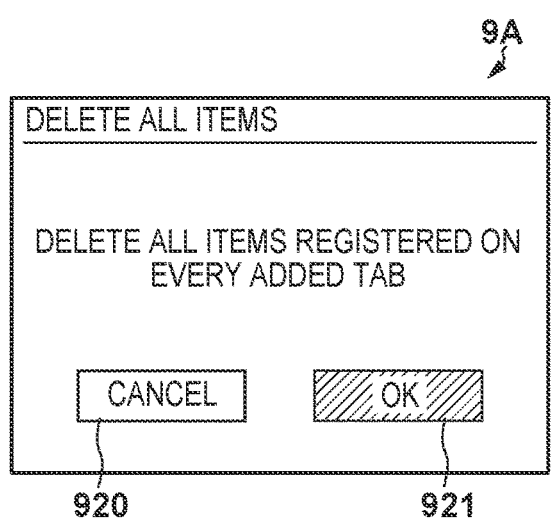
Figure 9C:
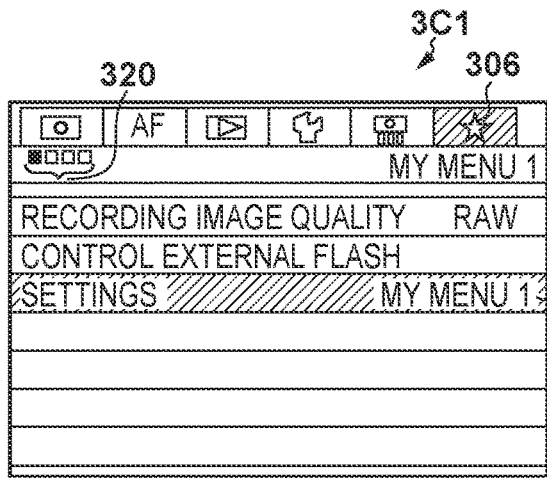
Figure 9D:
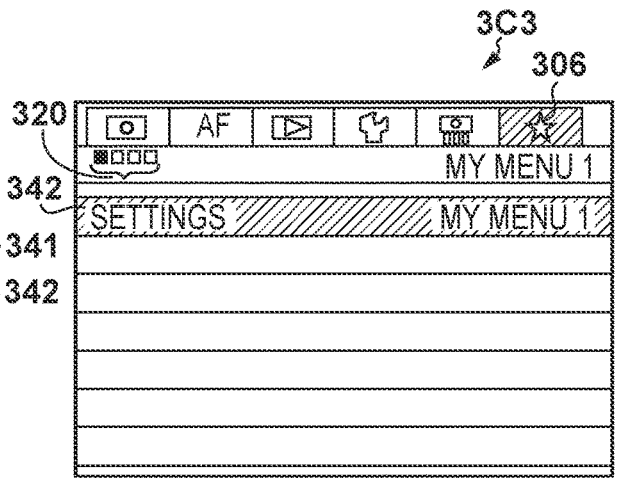
Figure 9E:
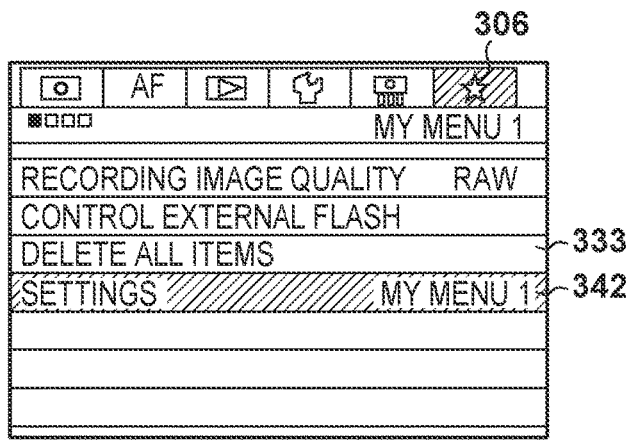

If the setting functions related to the entirety of my menu, such as "delete all items" 333, are displayed as menu items included in each my menu small tab, display shown in FIG. 9E is performed. However, this makes it difficult to understand whether the function performed upon selection of "delete all items" 333 is to simultaneously delete all menu items in the my menu small tab currently selected, or to simultaneously delete all items both in the my menu small tab currently selected and in other my menu small tabs. This gives rise to a risk that the user may perform the function of "delete all items" 333 against his/her intention to delete all menu items only in the my menu small tab currently selected, which results in an erroneous operation of simultaneously deleting all items included both in the my menu small tab currently selected and in other my menu small tabs. In contrast, as described above, the my menu settings tab 326 is provided as a menu different from the my menu small tabs, and setting functions related to the entirety of my menu, such as "delete all my menu tabs" 332 and "delete all items" 333, are allocated thereto. This lowers the possibility of erroneous operations compared with display shown in FIG. 9E.

<Processing for Displaying Menu Corresponding to Menu Item Currently Focused>

Figure 6:
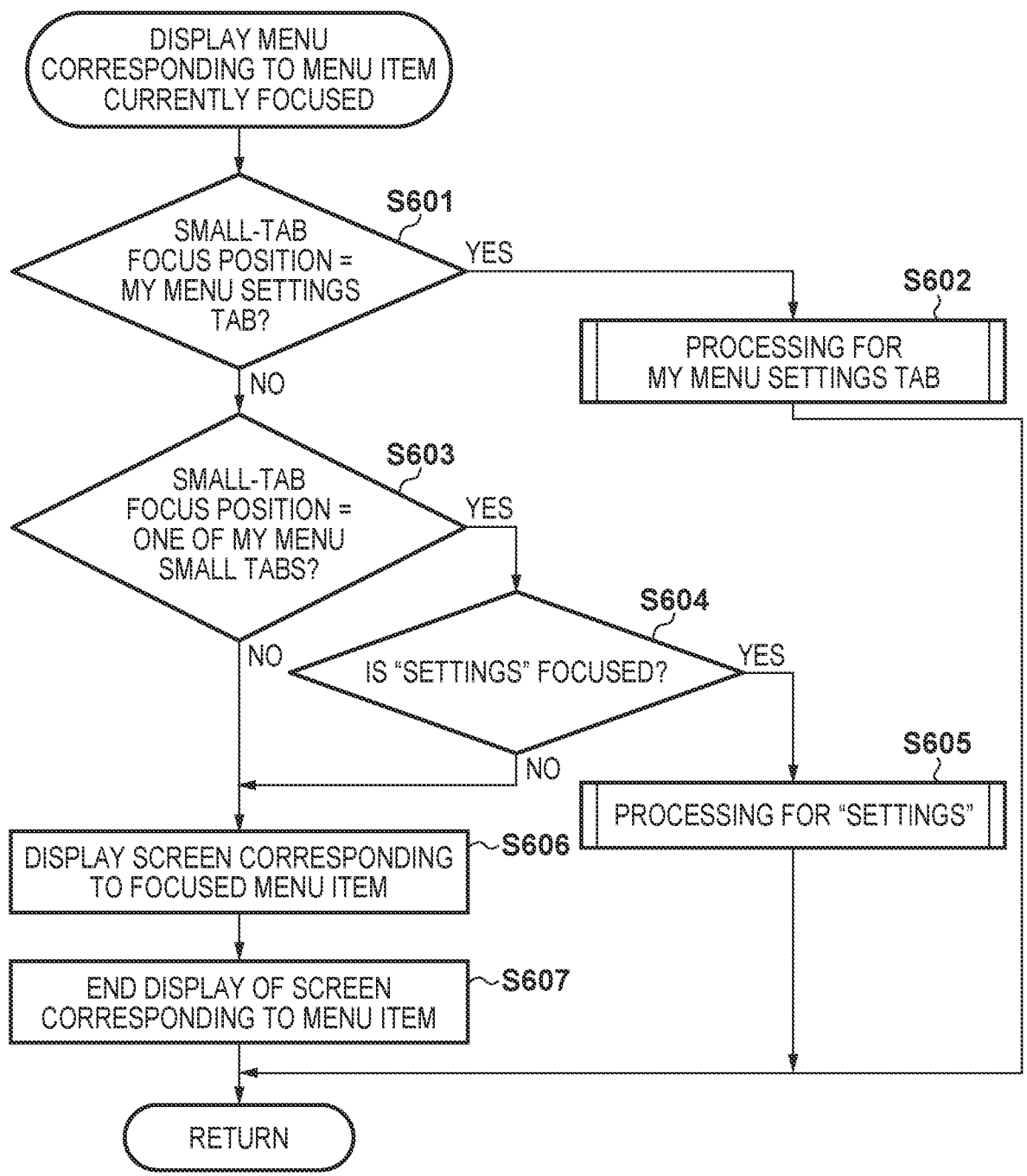
FIG. 6 is a flowchart showing processing for displaying a menu corresponding to a menu item.

With reference to FIG. 6, a description is now given of processing in step S415 of FIG. 4B, i.e., processing for displaying a menu corresponding to a menu item 341 or 342 currently focused.

In step S601, the control unit 210 determines whether a small-tab focus position is the my menu settings tab 326; it proceeds to step S602 if the small-tab focus position is the my menu settings tab 326, and proceeds to step S603 otherwise.

In step S602, the control unit 210 performs processing for the my menu settings tab 326. The details of processing in step S602 will be described later with reference to FIGS. 7A and 7B.

In step S603, the control unit 210 determines whether the small-tab focus position is one of the my menu small tabs 320; it proceeds to step S604 if the small-tab focus position is one of the my menu small tabs 320, and proceeds to step S606 otherwise.

In step S604, the control unit 210 determines whether a menu item that is focused among the menu items included in the my menu small tab is "settings" 342. It proceeds to step S605 if "settings" 342 is focused, and proceeds to step S606 otherwise (that is to say, if a my menu item 341 is focused).

In step S605, the control unit 210 performs processing for "settings" 342. The details of processing in step S605 will be described later with reference to FIGS. 14A and 14B.

In step S606, the control unit 210 starts display of a screen corresponding to a focused menu item 309. Then, it proceeds to step S607 after the user has changed the settings of or performed the functions of the camera 100 on the screen.

In step S607, the control unit 210 ends display of the screen that was started in step S606.

<Processing for My Menu Settings Tab>

With reference to FIGS. 7 and 8A to 8C, a description is now given of processing for the my menu settings tab 326 in step S602 of FIG. 6.

(Processing for Adding My Menu Tab)

In step S701, the control unit 210 determines whether a focused menu item is "add my menu tab" 331 (FIG. 8A); it proceeds to step S702 if it determines affirmatively, and proceeds to step S704 otherwise.

In step S702, the control unit 210 determines whether it has accepted, through a user operation, an instruction indicating confirmation of the addition of a my menu tab; it proceeds to step S703 if it has accepted such an instruction, and ends processing if it has accepted an instruction for cancelling the addition of a my menu tab.

Figure 8A:
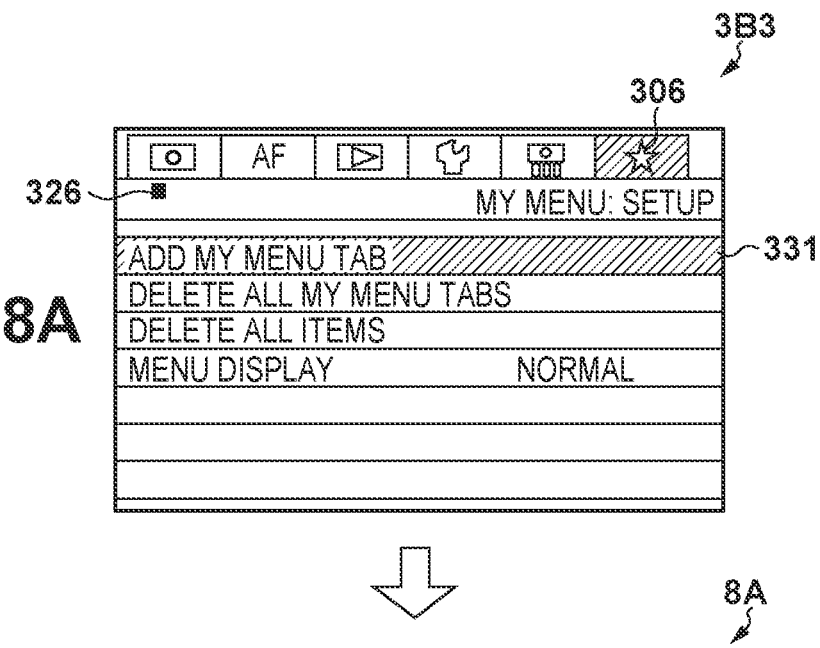
FIGS. 8A to 8C show transition of a menu screen in the processing for the my menu settings tab.
Figure 8B:
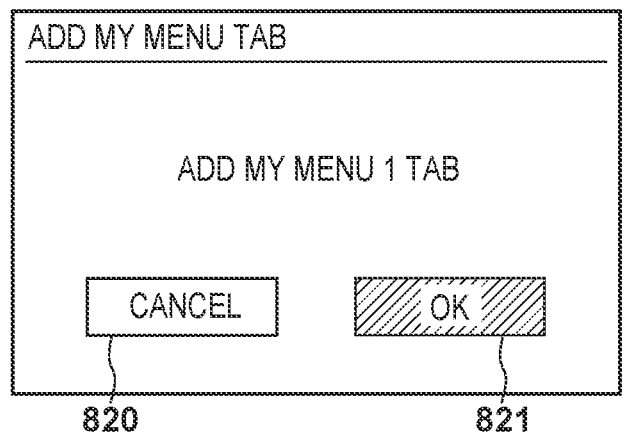
Figure 8C:
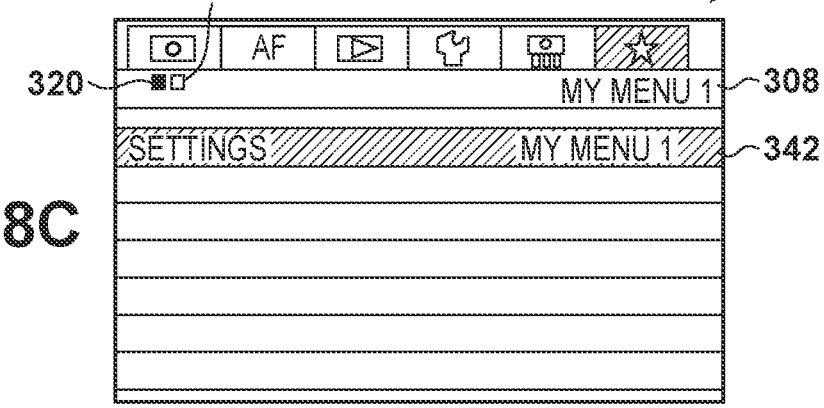

The control unit 210 performs processing for increasing the number of registered my menu small tabs 320 stored in the non-volatile memory 204 by one in step S703, and then proceeds to step S717. With reference to FIGS. 8A to 8C, the details of a screen transition in processing for "add my menu tab" 331 in steps S701 to S703 will now be described.

FIGS. 8A to 8C show a screen transition upon selection of "add my menu tab" 331. When the user selects "add my menu tab" 331 on a screen 3B3 of FIG. 8A, the control unit 210 displays a screen 8A of FIG. 8B. If the user presses a cancel button 820 on the screen 8A, the control unit 210 displays the screen 3B3 prior to the selection without adding a my menu tab. On the other hand, if the user presses an OK button 821 on the screen 8A, the control unit 210 increases the number of registered my menu small tabs 320 stored in the non-volatile memory 204 by one, and displays a screen 3C3 of FIG. 8C. Although no my menu small tab 320 is displayed on the screen 3B3, the number of my menu small tabs 320 is increased by one on the screen 3C3 due to the addition of the my menu tab. FIGS. 8A to 8C show an example in which the number of my menu small tabs 320 increases from zero; however, no matter how many my menu tabs exist, the addition processing can be performed up to the upper limit of the number of registered my menu tabs. Furthermore, although a small-tab focus position is the my menu settings tab 326 prior to the addition, focus moves to the added my menu tab after the addition processing (FIG. 8C). The control unit 210 moves the small-tab focus position to the added my menu small tab 320, and stores the moved small-tab focus position into the volatile memory 203.

(Processing for Deleting All My Menu Tabs)

In step S704, the control unit 210 determines whether a focused menu item is "delete all my menu tabs" 332 (FIG. 12A); it proceeds to step S705 if it determines affirmatively, and proceeds to step S707 otherwise.

In step S705, the control unit 210 determines whether it has accepted, through a user operation, an instruction indicating whether to delete all my menu tabs; it proceeds to step S706 if it has accepted an instruction indicating confirmation of the deletion of all my menu tabs, and ends processing if it has accepted an instruction for cancelling the deletion of all my menu tabs.

In step S706, the control unit 210 performs processing for "delete all my menu tabs" 332. The details of processing in step S706 will be described later with reference to FIGS. 12A to 12D and 13.

(Processing for Deleting All Items)

In step S707, the control unit 210 determines whether a focused menu item is "delete all items" 333 (FIG. 9A); it proceeds to step S708 if it determines affirmatively, and proceeds to step S710 otherwise.

In step S708, it determines whether it has accepted, through a user operation, an instruction indicating whether to delete all items; it proceeds to step S709 if it has accepted an instruction indicating confirmation of the deletion of all items, and ends processing if it has accepted an instruction indicating cancellation of the deletion of all items.

The control unit 210 performs processing for simultaneously deleting all of the my menu items 341 registered on every my menu small tab 320 stored in the non-volatile memory 204 in step S709, and then proceeds to step S717.

With reference to FIGS. 9A to 9E, the details of a screen transition in processing for "delete all items" 333 in steps S707 to S709 will now be described.

FIGS. 9A to 9E show a screen transition upon selection of "delete all items" 333.

"Delete all items" 333 is a menu item for performing a function of deleting all of the my menu items 341 registered on every my menu small tab 320.

When "delete all items" 333 is selected on a screen 3B1 of FIG. 9A in a state where the my menu items 341 are registered on the my menu small tabs 320 (FIG. 9C), the control unit 210 displays a screen 9A of FIG. 9B. If the user presses a cancel button 920 on the screen 9A, the control unit 210 displays the screen 3B1 prior to the selection without deleting all items. On the other hand, if the user presses an OK button 921 on the screen 9A, the control unit 210 changes the number of all menu items registered on every my menu small tab 320 stored in the non-volatile memory 204 to zero, and then displays the screen 3B1. If the user performs an operation of displaying a my menu small tab 320 before performing "delete all items" 333, the my menu items 341 registered on the my menu small tab 320 are displayed as on a screen 3C1 of FIG. 9C. On the other hand, if the user performs an operation of displaying a my menu small tab 320 after performing "delete all items" 333, no my menu item 341 is displayed on every my menu small tab 320 as on a screen 3C3 of FIG. 9D. In this case, unlike "delete all my menu tabs", my menu small tabs are not deleted, and a menu of every my menu small tab has no menu item but "settings".

(Processing for Menu Display)

In step S710, the control unit 210 determines whether a focused menu item is "menu display" 334; it proceeds to step S711 if it determines affirmatively, and ends processing otherwise.

In step S711, the control unit 210 displays a screen (FIG. 10B) that shows setting items 1001 to 1003 of "menu display" 334. The control unit 210 also determines whether a setting item selected on the screen of FIG. 10B is "normal display" 1001; it proceeds to step S712 if the selected setting item is "normal display" 1001, and proceeds to step S713 otherwise.

The control unit 210 changes the setting of "menu display" stored in the non-volatile memory 204 to "normal display" in step S712, and then proceeds to step S717.

In step S713, the control unit 210 determines whether a setting item selected on the screen of FIG. 10B is "display my menu tab first" 1002; it proceeds to step S714 if it determines affirmatively, and proceeds to step S715 otherwise.

The control unit 210 changes the setting of "menu display" stored in the non-volatile memory 204 to "display my menu tab first" in step S714, and then proceeds to step S717.

In step S715, the control unit 210 determines whether a setting item selected on the screen of FIG. 10B is "display only my menu tab" 1003; it proceeds to step S716 if it determines affirmatively, and ends processing otherwise.

The control unit 210 changes the setting of "menu display" stored in the non-volatile memory 204 to "display only my menu tab" in step S716, and then proceeds to step S717.

In step S717, the control unit 210 performs processing for regenerating large and small tabs based on the my menu small tabs 320 and the settings of "menu display" stored in the non-volatile memory 204, as well as processing for updating a screen being displayed.

With reference to FIGS. 10A to 10C, a description is now given of the details of a screen transition in the processing for the settings of "menu display" in steps S710 to S716.

FIGS. 10A to 10C show a screen transition upon selection of "menu display" 334.

"Menu display" 334 is a setting item related to a screen that is displayed first upon menu display, and can be set to one of three states, that is to say, setting items 1001 to 1003.

"Normal display" is the setting in which, when display of a menu screen (step S402) is started, the menu screen is displayed in a state where the large and small tabs that were focused immediately before closing a previous menu screen (items that were selected last on the previous menu screen) are focused. When "normal display" is set, for example, display of a menu screen starts with the screen 3A of FIG. 3A. In the state of the screen 3A of FIG. 3A, all of the large tabs 301 to 306 and the small tabs belonging thereto are displayed.

"Display my menu tab first" is the setting in which, when display of a menu screen (step S402) is started, the menu screen is displayed in a state where the my menu tab 306 is focused, even if a large tab that was focused immediately before closing a previous menu screen was not the my menu tab 306. In addition, display of the menu screen is started in a state where a small tab (320 or 326) belonging to the my menu tab 306 is focused. That is to say, this setting enables quick opening of my menu composed of menu items registered by the user simply by pressing the menu button 110 once. After the menu has been opened, the menu can be switched to a menu of a small tab belonging to another large tab through a user operation. When "display my menu tab first" is set, for example, display of a menu screen starts with a screen 3B1 of FIG. 10A. On the screen 3B1 of FIG. 10A, all of the large tabs 301 to 306 are displayed with the my menu tab 306 being focused.

"Display only my menu tab" 1003 is the setting for displaying a menu in which only the my menu tab 306 is displayed as a large tab, and other large tabs are not displayed. Only the my menu tab 306 and the small tabs 320, 326 belonging thereto are displayed. Therefore, menus belonging to other large tabs cannot be opened. When "display only my menu tab" is set, for example, display of a menu screen starts with a screen 3B2 of FIG. 10C and the screen 3C2 of FIG. 3C2.

Although a setting value of "menu display" is decided on by the user operating the operation units 205 in the description of FIGS. 7 and 10A to 10C, the setting value may be decided on through determination made by the control unit 210 based on the number of my menu small tabs 320. For example, the control unit 210 may perform control so as to set the setting value of "menu display" to "display only my menu tab" when the number of my menu small tabs 320 is equal to or greater than a certain number (a predetermined number). In this way, when "normal display" is set, if the number of added my menu small tabs 320 is smaller than the predetermined number, large tabs other than the my menu tab 306 are displayed, e.g., small tabs belonging to the shooting tab 301 are displayed in a case where the shooting tab 301 is selected. In this state, if the number of added my menu small tabs 320 becomes equal to or greater than the predetermined number, the setting value is automatically changed to "display only my menu tab", and the large tabs other than the my menu tab 306 are no longer displayed. Therefore, for example, the small tabs belonging to the shooting tab 301 are no longer displayed.

With an increase in the number of my menu small tabs 320, more user operations are required to move focus on the small tabs 307, and moving focus on the small tabs 307 using the left/right buttons 125 and the main dial 114 requires effort and time during operation. In view of this, in order to move between small tabs at the lowest possible frequency and reduce effort during operation, it is effective to set "display only my menu tab" when the number of my menu small tabs 320 is equal to or greater than the certain number.

<Processing for Displaying Menu Screen>

Figure 11:
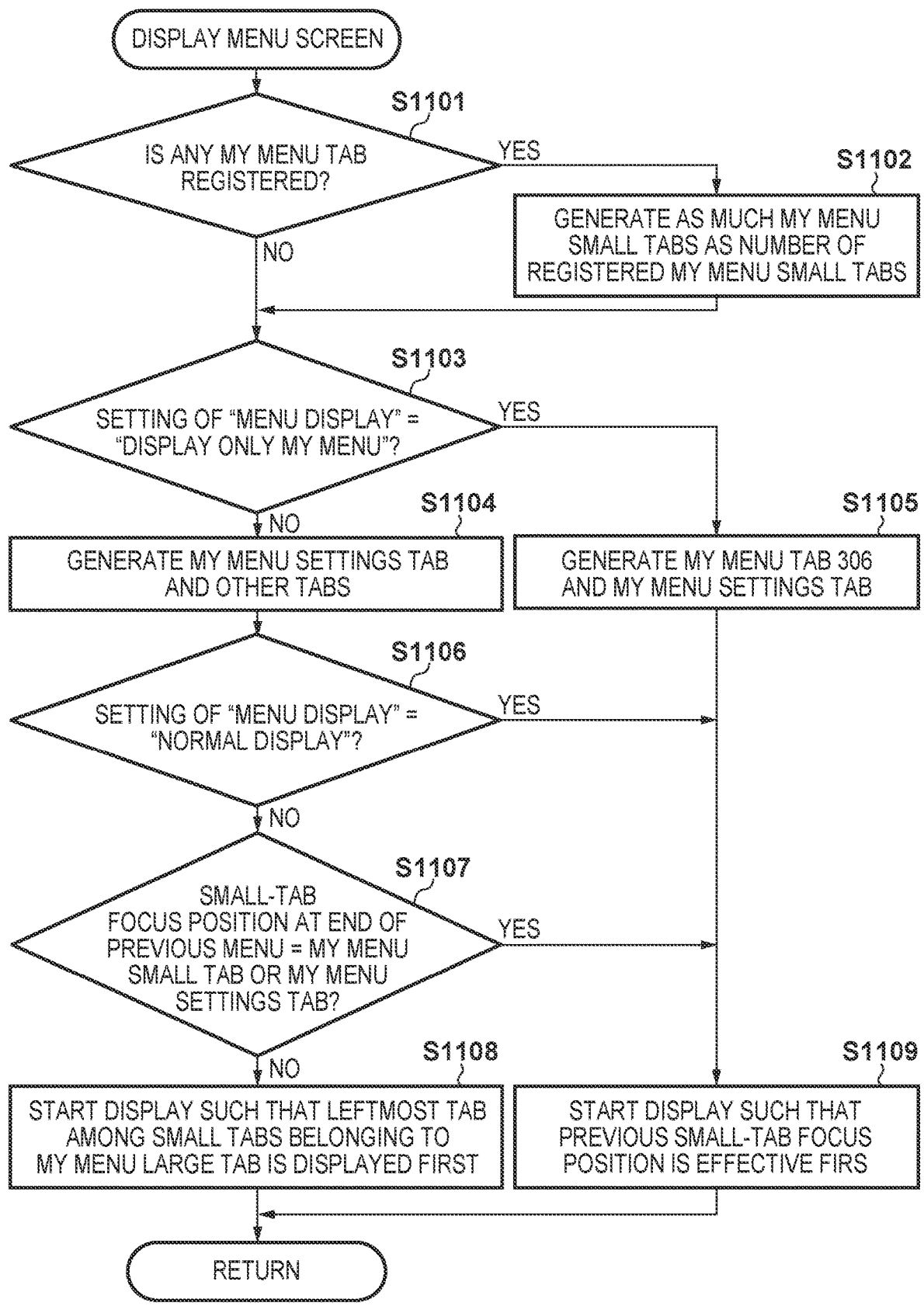
FIG. 11 is a flowchart showing processing for displaying a menu screen.

With reference to FIG. 11, a description is now given of processing for displaying a menu screen in step S402 of FIG. 4A.

In step S1101, the control unit 210 reads the number of registered my menu small tabs 320 stored in the non-volatile memory 204, and determines whether the read number is equal to or greater than one. It proceeds to step S1102 if the read number is equal to or greater than one, and proceeds to step S1103 if the read number is zero.

In step S1102, the control unit 210 generates as many my menu small tabs 320 as the number of registered my menu small tabs 320 stored in the non-volatile memory 204.

In step S1103, the control unit 210 reads the current setting of "menu display" 334 stored in the non-volatile memory 204. The control unit 210 proceeds to step S1105 if the read setting is "display only my menu tab", and proceeds to step S1104 if the read setting is "normal display" or "display my menu tab first".

In step S1104, the control unit 210 generates the my menu settings tab 326, other small tabs 307, the my menu tab 306, and other large tabs 301 to 305.

In step S1105, the control unit 210 generates the my menu settings tab 326 and the my menu tab 306.

In step S1106, the control unit 210 determines whether the current setting of "menu display" 334 stored in the non-volatile memory 204 is "normal display". It proceeds to step S1109 if the current setting is "normal display", and proceeds to step S1107 otherwise, that is to say, if the current setting is "display my menu tab first".

In step S1107, the control unit 210 reads a small-tab focus position at the end of previous menu display, which is stored in the volatile memory 203, and determines whether the focus position is the my menu settings tab 326. It proceeds to step S1109 if the focus position is the my menu settings tab 326, and proceeds to step S1108 otherwise.

In step S1108, the control unit 210 starts display such that the leftmost tab among the my menu small tabs 320 is displayed first. Here, for example, the screen 3C1 of FIG. 3C1 is displayed.

In step S1109, the control unit 210 starts display such that the small-tab focus position at the end of previous menu display, which is stored in the volatile memory 203, is effective first. Here, for example, the screens 3A, 3B1, and 3C1 of FIGS. 3A, 3B1, and 3C1 are displayed.

<Processing for Deleting All My Menu Tabs>

Figure 7A:
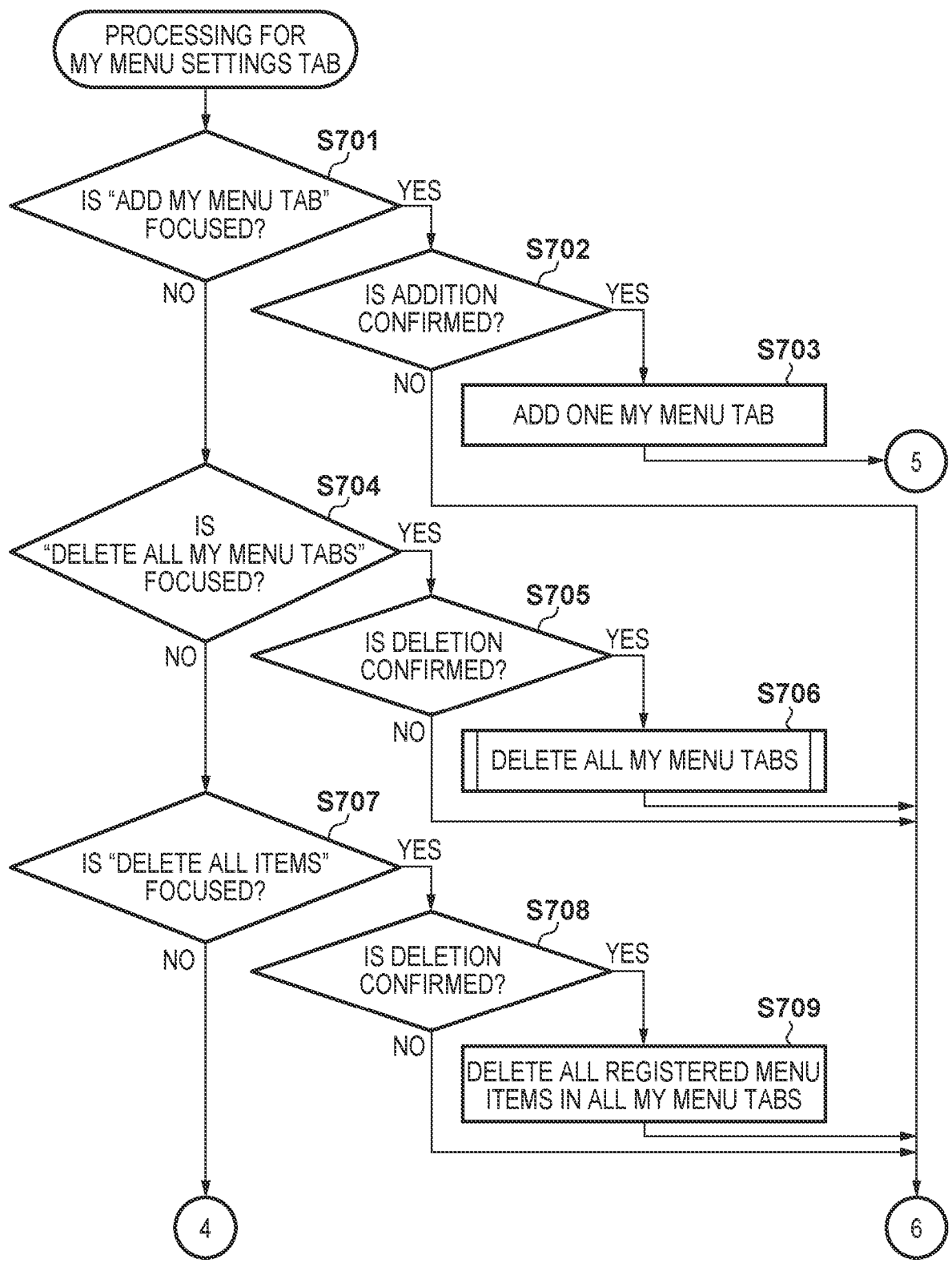
FIGS. 7A and 7B are flowcharts showing processing for a my menu settings tab.
Figure 7B:
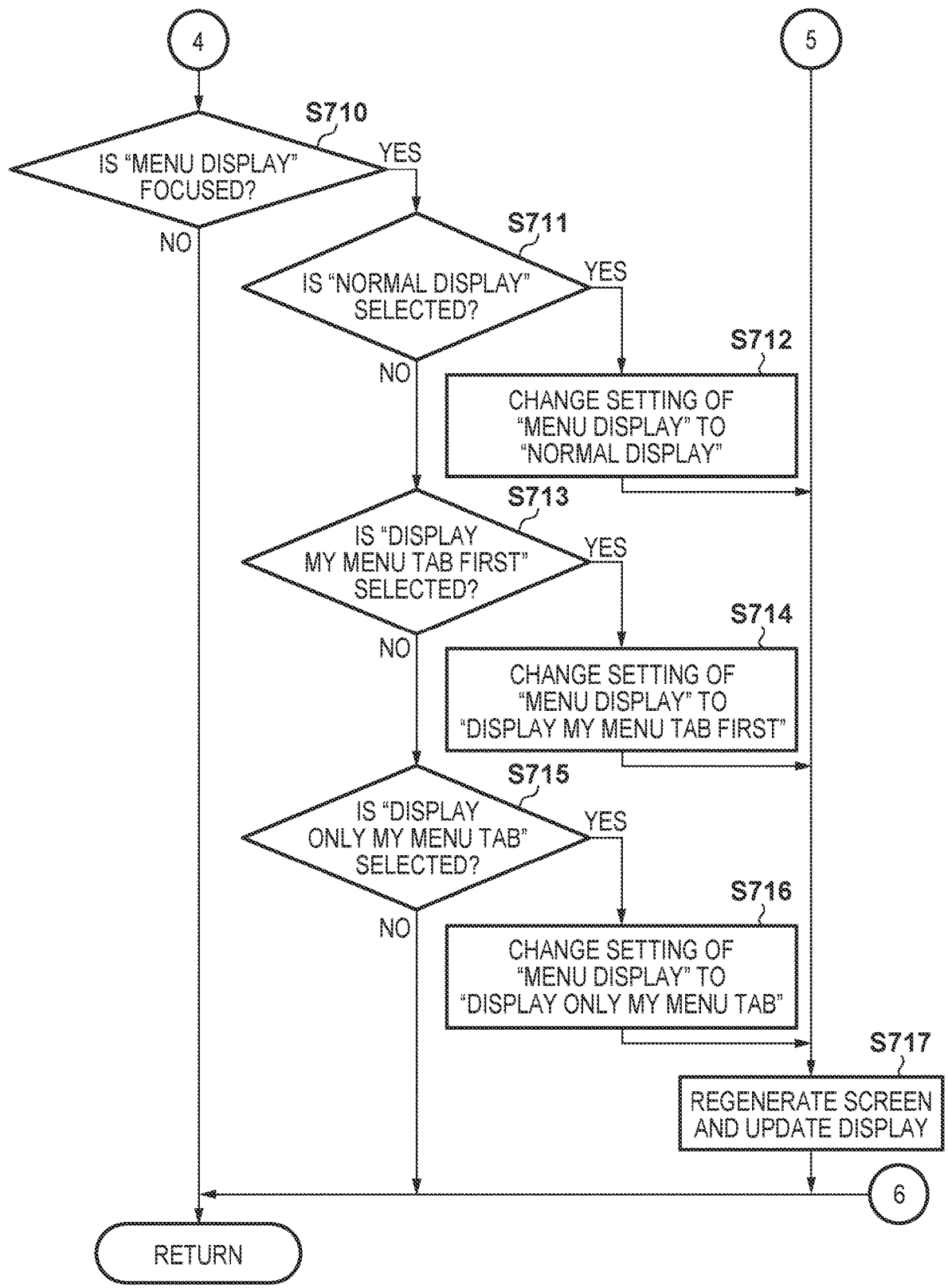

With reference to FIGS. 12A to 12D and 13, a description is now given of processing for deleting all my menu tabs in step S706 of FIG. 7A.

FIGS. 12A to 12D show a screen transition upon selection of "delete all my menu tabs" 332.

When "delete all my menu tabs" 332 is selected on a screen 3B1 of FIG. 12A while an item other than "only my menu tab" is selected as the setting of "menu display" 334, the control unit 210 displays a screen 12A of FIG. 12B. When "delete all my menu tabs" 332 is selected on a screen 3B2 of FIG. 12D while "display only my menu tab" is selected, the control unit 210 also displays the screen 12A of FIG. 12B. If a cancel button 1200 is pressed on the screen 12A through a user operation, the control unit 210 displays the screen 3B1 or 3B2 depending on the screen state prior to the selection without deleting tabs. On the other hand, if an OK button 1201 is pressed on the screen 12A, the control unit 210 deletes all of the added my menu small tabs 320 and displays a screen 3B3 of FIG. 12C. As shown on the screen 3B3, all of the large tabs are displayed even if the transition has been made via the screen 3B2.

Figure 13:
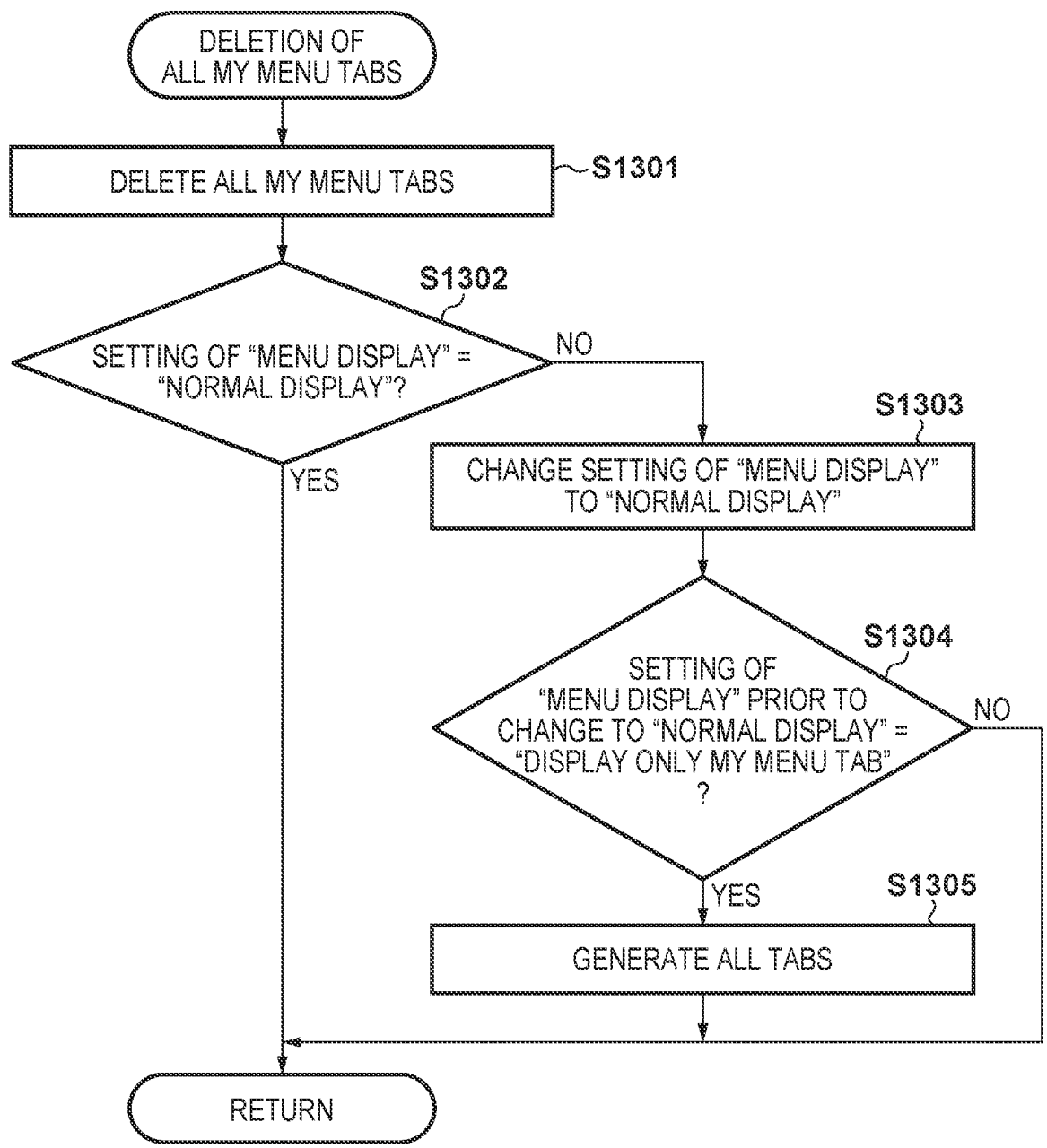
FIG. 13 is a flowchart showing the processing for deleting all my menu tabs.

FIG. 13 shows processing for deleting all my menu tabs in step S706 of FIG. 7A.

In step S1301, the control unit 210 changes the number of registered my menu small tabs 320 stored in the non-volatile memory 204 to zero.

In step S1302, the control unit 210 reads the setting of "menu display" 334 from the non-volatile memory 204 and determines whether the read setting is "normal display"; it ends processing if it determines affirmatively, and proceeds to step S1303 otherwise.

In step S1303, the control unit 210 changes the setting of "menu display" 334 to "normal display", and stores the changed setting value into the non-volatile memory 204. The control unit 210 also saves the state prior to the change into the volatile memory 203 for use in determination of step S1304, and proceeds to step S1304.

In step S1304, the control unit 210 reads the setting of "menu display" 334 prior to the change, which was saved into the volatile memory 203 in step S1303, and determines whether the read setting is "display only my menu tab"; it proceeds to step S1305 if it determines affirmatively, and ends processing otherwise.

In step S1305, the control unit 210 generates all of the large tabs other than the my menu tab and small tabs.

It is presumed that performing the above-described processing for "delete all my menu tabs" while "display my menu tab first" or "display only my menu tab" is set renders the my menu functions unnecessary for the user. Therefore, it is presumed that the functions of "display my menu tab first" or "display only my menu tab" are also rendered unnecessary. Restoring the setting of "menu display" 334 to "normal display" upon deletion of all my menu tabs achieves the effect of reducing the effort required by the user to change the setting of "menu display" 334 after deleting my menu tabs.

In addition, when all my menu tabs are deleted in a state where "display only my menu tab" is set, all of the large tabs 300 other than the my menu tab 306 are displayed at the same time as the deletion of all my menu tabs. This enables the user to instantly discern restoration to the state of "normal display" under "menu display" 334.

<Functions of My Menu Tab>

Figure 14A:
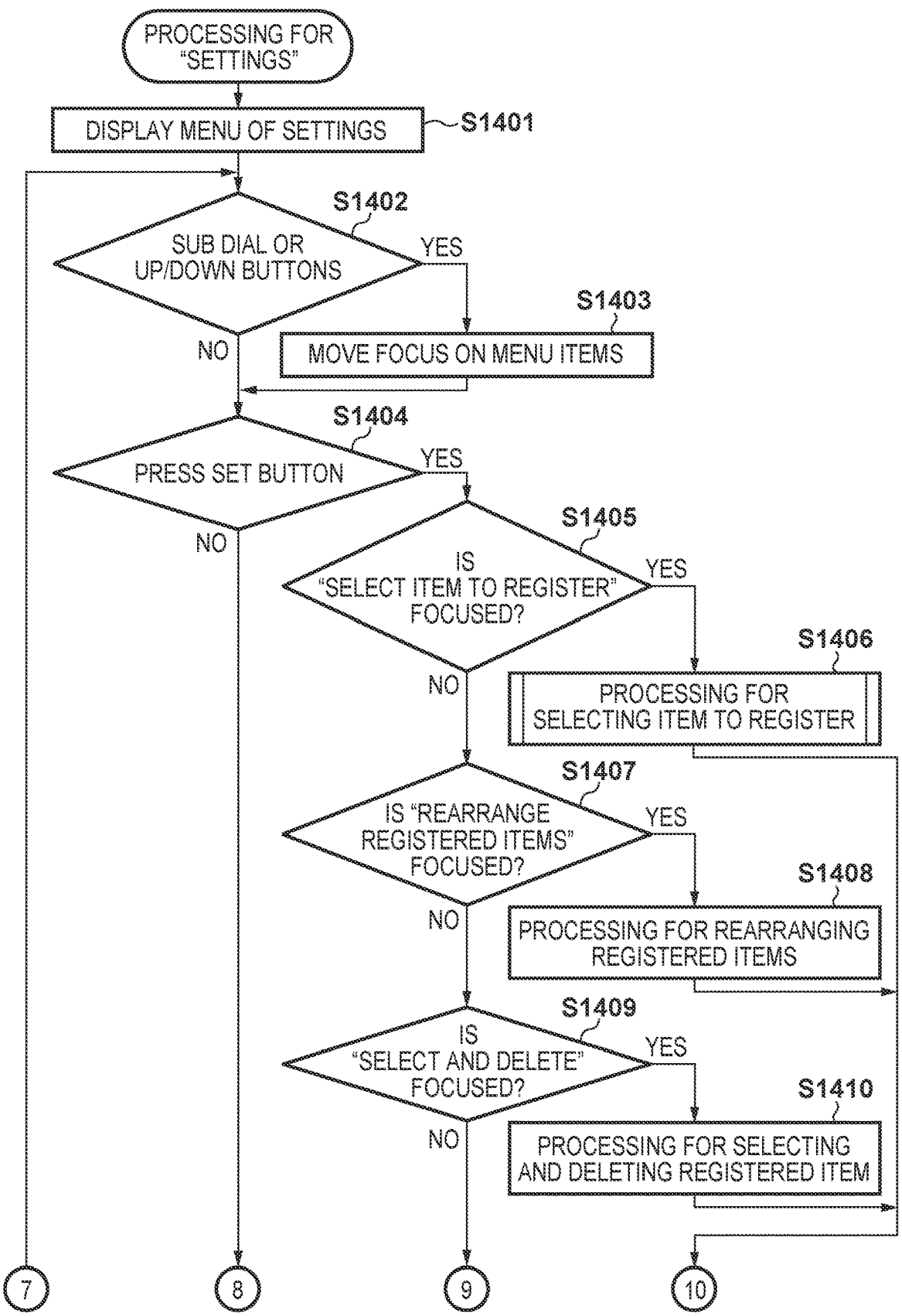

With reference to FIGS. 14A and 14B, a description is now given of processing for settings in step S605 of FIG. 6.

In step S1401, upon selection of "settings" 342 on a screen 15A of FIG. 15A, the control unit 210 displays menu items 1501 to 1506 as on a screen 15B of FIG. 15B, which represent a menu in a lower layer below the layer of the item "settings" 342.

In step S1402, the control unit 210 determines whether the sub dial 115 or the up/down buttons 121 have been operated; if operated, it proceeds to step S1403, and if not operated, it proceeds to step S1404.

In step S1403, the control unit 210 performs processing for moving focus on the menu items 1501 to 1506. When the sub dial 115 is operated clockwise or the down button 123 is pressed, focus is moved downward. On the other hand, when the sub dial 115 is operated counterclockwise or the up button 122 is pressed, focus is moved upward. The control unit 210 also stores a menu item serving as a focus move destination into the volatile memory 203.

In step S1404, the control unit 210 determines whether the set button 113 is pressed; if pressed, it proceeds to step S1405, and if not pressed, it proceeds to step S1416.

(Select Item to Register)

In step S1405, the control unit 210 determines whether a menu item currently focused is "select item to register" 1501 (the screen 15B of FIG. 15B); it proceeds to step S1406 if it determines affirmatively, and proceeds to step S1407 otherwise.

In step S1406, the control unit 210 performs processing for "select item to register" 1501. The details of processing in step S1406 will be described later with reference to FIGS. 15A to 15K and 16.

(Rearrange Registered Items)

In step S1407, the control unit 210 determines whether a menu item currently focused is "rearrange registered items"

1502; it proceeds to step S1408 if it determines affirmatively, and proceeds to step S1409 otherwise.

In step S1408, the control unit 210 performs processing for "rearrange registered items". In the processing for "rearrange registered items", the my menu items 341 registered on a my menu small tab 320 currently focused are rearranged in accordance with a user operation. Note that among the menu items included in a menu of a my menu small tab 320, "settings" 342 is the bottommost menu item, and the arrangement order thereof cannot be changed.

(Select and Delete)

In step S1409, the control unit 210 determines whether a menu item currently focused is "select and delete" 1503; it proceeds to step S1410 if it determines affirmatively, and proceeds to step S1411 otherwise.

In step S1410, the control unit 210 performs processing for "select and delete". In the processing for "select and delete", one my menu item 341 that has been designated by the user from among the registered my menu items 341 on a my menu small tab 320 currently focused is deleted from the my menu small tab 320 currently focused.

(Delete All Items in Tab)

In step S1411, the control unit 210 determines whether an item currently focused is "delete all items in tab" 1504; it proceeds to step S1412 if it determines affirmatively, and proceeds to step S1413 otherwise.

In step S1412, the control unit 210 performs processing for "delete all items in tab". In the processing for "delete all items in tab", all of the registered my menu items 341 on a my menu small tab 320 currently focused are deleted from the my menu small tab 320 currently focused.

(Delete Tab)

In step S1413, the control unit 210 determines whether an item currently focused is "delete tab" 1505; it proceeds to step S1414 if it determines affirmatively, and proceeds to step S1415 otherwise.

In step S1414, the control unit 210 performs processing for "delete tab" 1505. The details of processing in step S1414 will be described later with reference to FIGS. 17A to 17H and 18.

(Change Tab Title)

In step S1415, the control unit 210 performs processing for "change tab title". In the processing for "change tab title", the tab title 308 of a my menu small tab 320 currently focused is changed to a character string that has been arbitrarily set by the user in accordance with a user operation.

In step S1416, the control unit 210 determines whether the menu button 110 is pressed; if pressed, it proceeds to step S1417, and if not pressed, it returns to step S1402.

In step S1417, the control unit 210 ends processing for displaying the settings screens of FIGS. 15A to 15K.

<Processing for Selecting Item to Register>

With reference to FIGS. 15A to 15K and 16, a description is now given of processing for selecting an item to register in step S1406 of FIG. 14A.

FIGS. 15A to 15K show a screen transition upon selection of "select item to register" 1501.

"Select item to register" 1501 is a menu item for performing a function of selecting and registering a my menu item that the user wants to register in a my menu small tab 320. On the screen 15A of FIG. 15A, small tabs belonging to the my menu tab 306 include the my menu settings tab 326 and the my menu small tabs 320, and small tabs composing the my menu small tabs 320 include the my menu 1 tab 321 and the my menu 2 tab 322. A small-tab focus position is the my menu 1 tab 321. Neither the my menu 1 tab 321 nor the my menu 2 tab 322 includes any my menu item 341 registered thereon.

Figure 15A:
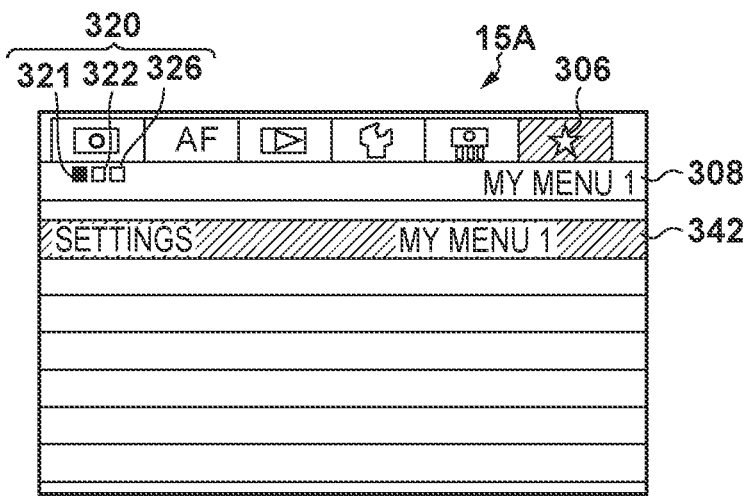
Figure 15B:
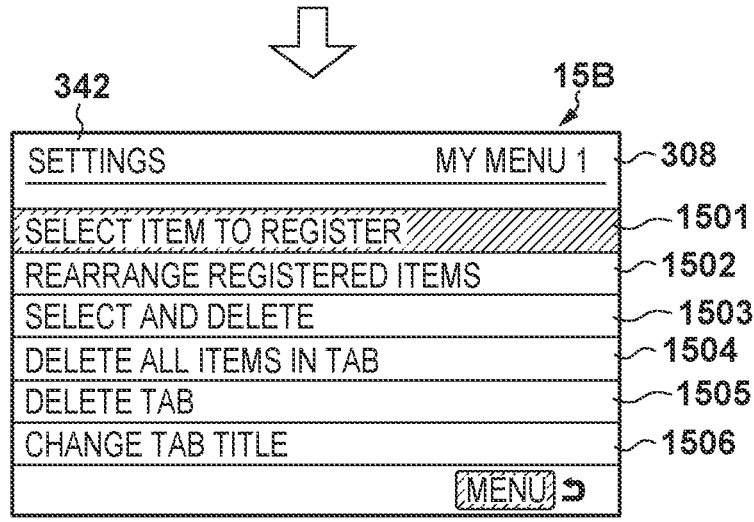

Upon selection of "settings" 342 on the screen 15A of FIG. 15A, the control unit 210 displays the settings screen 15B of FIG. 15B for the my menu 1 tab 321.

Upon selection of "select item to register" 1501 on the settings screen 15B, the control unit 210 displays a selection screen 15C of FIG. 15C for selecting an item to register, which is a screen for adding a my menu item to a small tab currently focused, i.e., the my menu 1 tab 321.

FIG. 15K exemplarily shows a list of menu items 1501 that can be added as my menu items. A list of selectable menu items denotes a collection of menu items 309 belonging to a small tab 307.

On the selection screen 15C of FIG. 15C, a recording image quality 1511 is focused in the list of menu items 1510. Upon selection of the recording image quality 1511 (when the set button 113 is pressed with focus thereon) on the selection screen 15C, the control unit 210 displays a screen 15D of FIG. 15D for confirming with the user whether to register the recording image quality 1511, which is a focused menu item.

If a cancel button 1520 is pressed on the confirmation screen 15D, the control unit 210 displays the selection screen 15C of FIG. 15C without registering the selected menu item. On the other hand, if an OK button 1521 is pressed, the control unit 210 registers the selected menu item, i.e., the recording image quality 1511 on the screen 15C, on the my menu 1 tab 321 currently focused, and displays a selection screen 15E of FIG. 15E for selecting an item to register.

The control unit 210 performs control such that, in the list of menu items 1510 on the screen 15E, the recording image quality 1512 is displayed in gray so as to make identifiable its unsettable state as it is already registered, and cannot be focused even if it is selected. The control unit 210 does not apply focus on the recording image quality 1512 as it is already registered, and applies focus on the next item, i.e., a time period to confirm a shot image 1513. In this way, control is performed so as to make unselectable an item that is already registered on a my menu small tab whose settings are currently configured.

When the menu button 110 is pressed on the screen 15E, the control unit 210 displays a settings screen 15B of FIG. 15F for the my menu 1 tab 321.

When the menu button 110 is pressed on the screen 15B, the control unit 210 displays a menu screen 15G of FIG. 15G. On the screen 15G, a small-tab focus position is the my menu 1 tab 321. Before "select item to register" 1501 is performed, no my menu item is registered on the menu screen 15A for the my menu 1 tab 321. In contrast, after "select item to register" 1501 is performed, one my menu item 341 is added to the menu screen 15G for the my menu 1 tab 321.

Figure 15H:
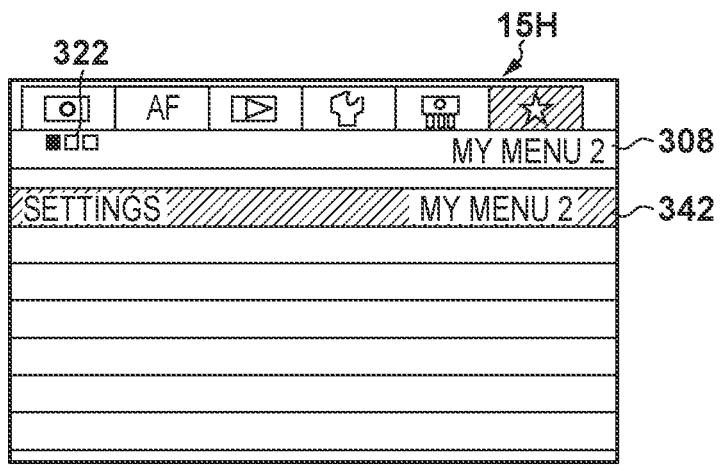

FIG. 15H exemplarily shows a screen 15H for a case in which the user has moved a small-tab focus position to the my menu 2 tab 322 on the screen 15G.

Figure 15I:
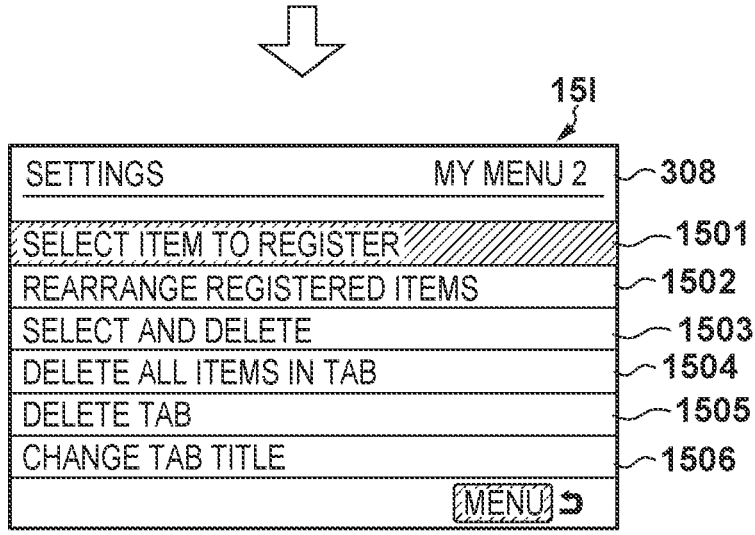

Upon selection of "settings" 342 on the screen 15H, the control unit 210 displays a settings screen 15I of FIG. 15I for the my menu 2 tab 322.

Upon selection of "select item to register" 1501 on the settings screen 15I, the control unit 210 displays a selection screen 15J of FIG. 15J for selecting an item to register, which is a screen for adding a my menu item to a small tab currently focused, i.e., the my menu 2 tab 322. On the screen 15E, the recording image quality 1512 is already registered and hence displayed in gray under "select item to register"

1501 for the my menu 1 tab 321; in contrast, on the settings screen 15J for the my menu 2 tab 322, the recording image quality 1511 is displayed in a registerable state as it is not registered yet.

As described above, the recording image quality 1511, which is already registered on the my menu 1 tab 321, cannot be registered redundantly on the my menu 1 tab 321, but can be registered on the my menu 2 tab 322. In other words, the same menu item cannot be registered redundantly on the same my menu small tab, but can be registered on another my menu small tab. This is because, provided that the user uses different my menu small tabs in different use cases, e.g., the user uses the my menu 1 tab 321 for humans and the my menu 2 tab 322 for scenery, it would be convenient if menu items can be registered on a plurality of my menu small tabs.

<Processing for Selecting Item to Register>

Figure 16A:
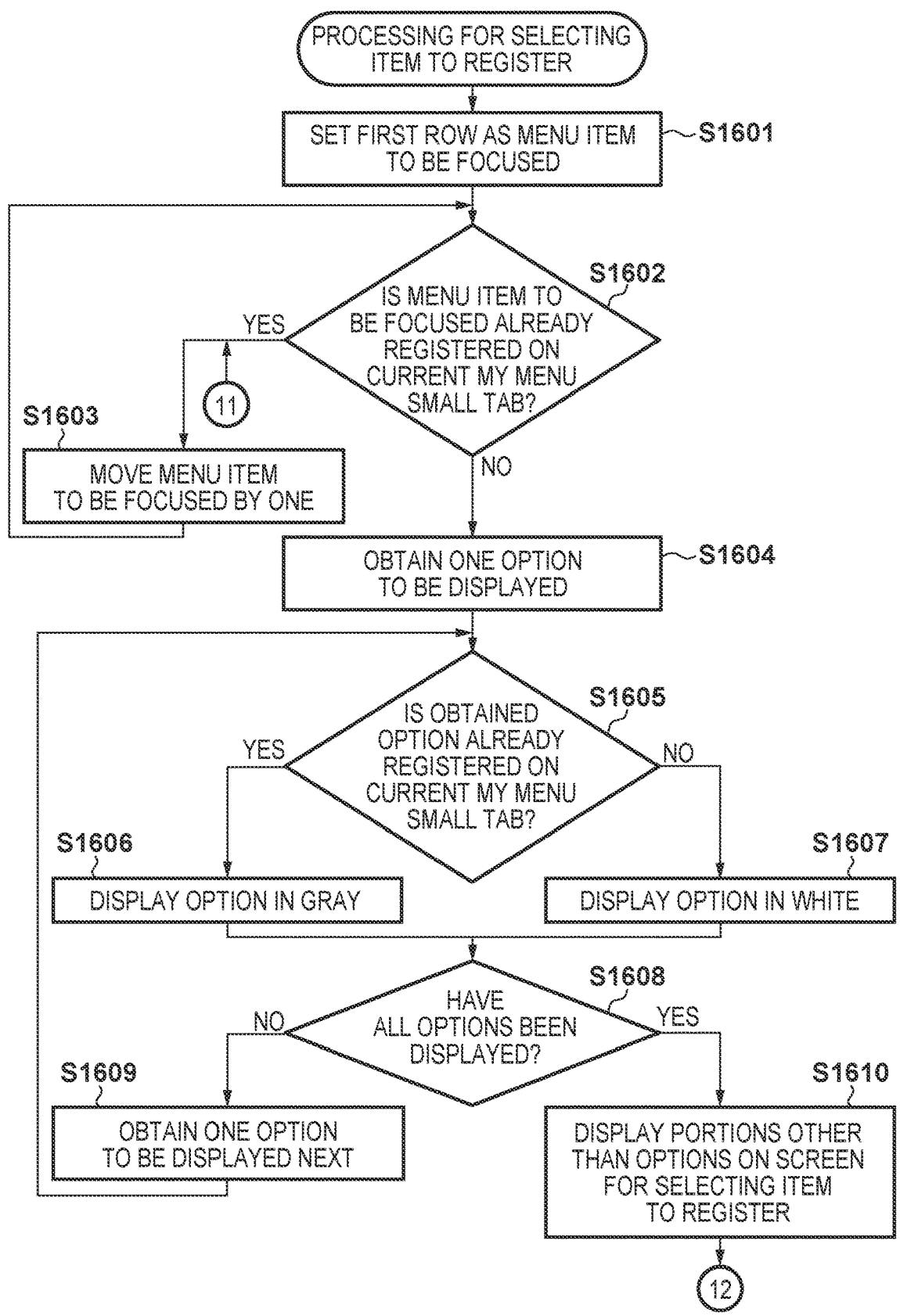
FIGS. 16A and 16B are flowcharts showing the processing for selecting an item to register in the processing for setting my menu.
Figure 16B:
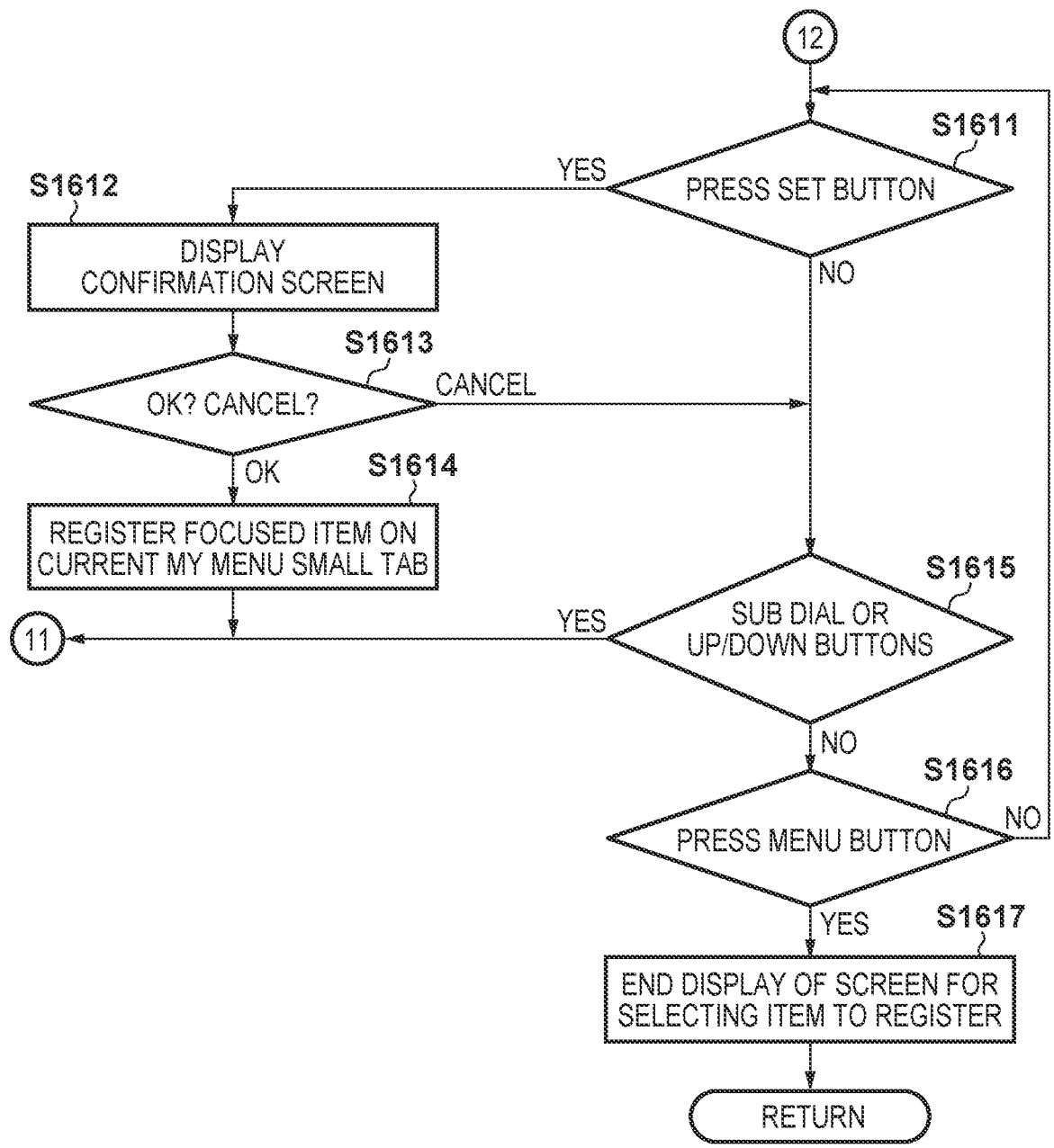

With reference to FIGS. 16A and 16B, a description is now given of processing for selecting an item to register in step S1406 of FIG. 14A.

In step S1601, the control unit 210 reads the first item from the list of menu items that are selectable through "select item to register" 1501 (FIG. 15K), which is stored in the non-volatile memory 204, and stores the read item into the volatile memory 203 as data of an item to be focused.

In step S1602, the control unit 210 determines whether the focus position stored in the volatile memory 203 is already registered on a current my menu small tab; it proceeds to step S1603 if the focus position is already registered, and proceeds to step S1604 if the focus position is not registered yet.

In step S1603, the control unit 210 reads the second item from the list of menu items that are selectable through "select item to register" 1501 (FIG. 15K), which is stored in the non-volatile memory 204, and stores the read item into the volatile memory 203 as data of an item to be focused.

Processing of steps S1602 and S1603 is repeated until arrival to a state in which data of an item to be focused, which is stored in the volatile memory 203, is not registered on the current my menu small tab.

In step S1604, the control unit 210 obtains one item to be displayed (option) from the list of menu items that are selectable through "select item to register" 1501 (FIG. 15K), which is stored in the non-volatile memory 204, and stores the obtained item into the volatile memory 203.

In step S1605, the control unit 210 determines whether the item to be displayed, which is stored in the volatile memory 203, is already registered on the current my menu small tab; it proceeds to step S1606 if the item is already registered, and proceeds to step S1607 if the item is not registered yet.

The control unit 210 displays the item to be displayed, which was obtained in step S1604, in gray so as to indicate its unsettable state in step S1606, and then proceeds to step S1608. Note that if this item is an item to be focused stored in the volatile memory 203, it is displayed with a focused display appearance.

The control unit 210 displays the item to be displayed, which was obtained in step S1604, in white so as to indicate its settable state in step S1607, and then proceeds to step S1608.

In step S1608, the control unit 210 determines whether all of the items to be displayed on the screen 15B of FIG. 15B have been displayed; it proceeds to step S1610 if all of them have been displayed, and proceeds to step S1605 if all of them have not been displayed.

In step S1609, the control unit 210 obtains one item to be displayed next from the list of menu items that are selectable through "select item to register" 1501 (FIG. 15K), which is stored in the non-volatile memory 204, and stores the obtained item into the volatile memory 203. Steps S1605 to S1609 are repeated until all of the items are displayed, that is to say, until arrival to a state in which display of menu items has been completed.

The control unit 210 displays other portions of the selection screen for selecting an item to register in step S1610, and then proceeds to step S1611.

In step S1611, the control unit 210 determines whether the set button 113 is pressed; if pressed, it proceeds to step S1612, and if not pressed, it proceeds to step S1613.

In step S1612, the control unit 210 displays the confirmation screen shown in FIG. 15D for asking the user whether to register the selected menu item in my menu.

In step S1613, the control unit 210 determines whether the cancel button 1520 is pressed (the set button 113 is pressed in a state where the cancel button 1520 is selected) or the OK button 1521 is pressed on the confirmation screen 15D of FIG. 15D. It proceeds to step S1615 if the cancel button 1520 is pressed, and proceeds to step S1614 if the OK button 1613 is pressed.

In step S1614, the control unit 210 registers the selected menu item (an item that was focused when the set button 113 was pressed in step S1611) as a menu item of the my menu small tab currently selected. That is to say, the selected menu item is recorded into the non-volatile memory 204 in correspondence with the my menu small tab currently selected.

In step S1615, the control unit 210 determines whether the sub dial 115 or the up/down buttons 121 have been operated; if operated, it proceeds to step S1614, and if not operated, it proceeds to step S1603.

In step S1616, the control unit 210 determines whether the menu button 110 is pressed; if pressed, it proceeds to step S1617, and if not pressed, it returns to step S1611.

In step S1617, the control unit 210 ends processing by ending display of the screen for selecting an item to register.

<Processing for Deleting Tab>

With reference to FIGS. 17A to 17H and 18, a description is now given of processing for deleting a tab in step S1414 of FIG. 14B.

FIGS. 17A to 17H show a screen transition upon selection of "delete tab" 1505.

Figure 17A:
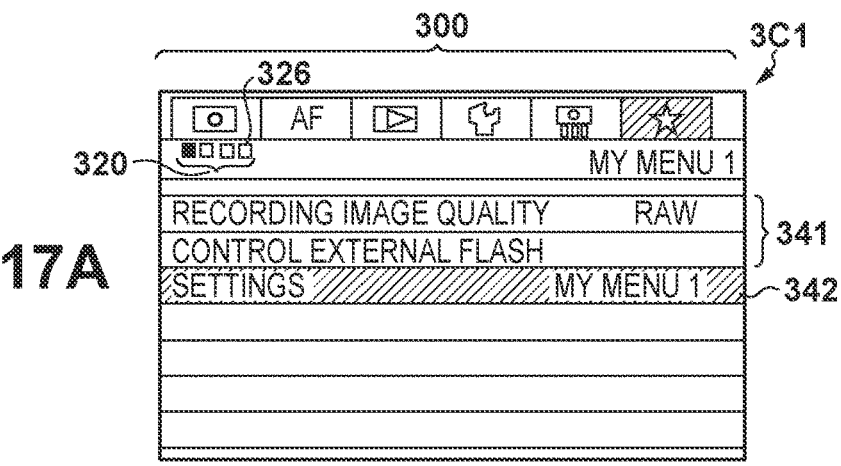
FIGS. 17A to 17H show a transition of a menu screen in processing for deleting a tab in the processing for setting my menu.
Figure 17B:
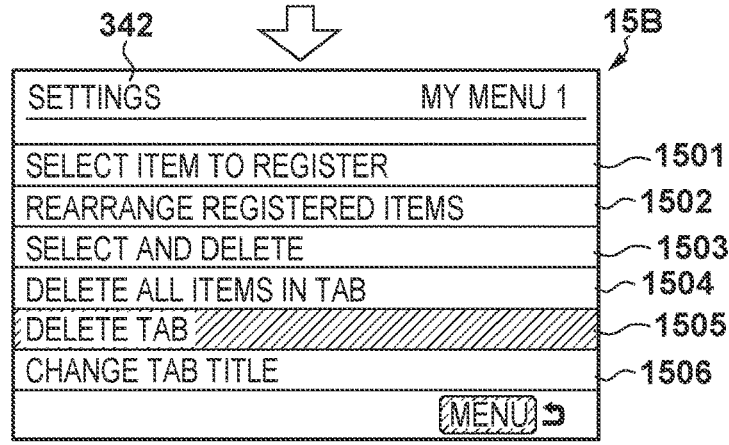

First, a description is given of a screen transition in a case where "delete tab" 1505 is selected on a screen 3C1 of FIG. 17B when the setting of "menu display" 334 is other than "display only my menu tab" (FIGS. 10A to 10C).

Figure 17C:
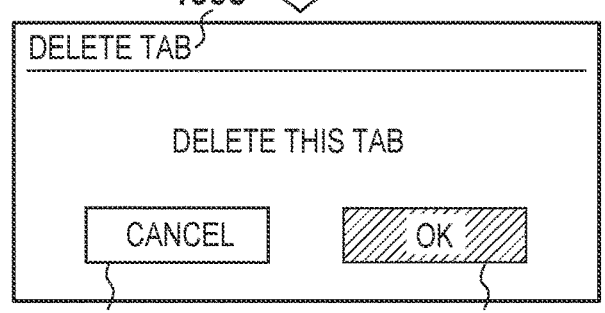
Figure 17D:
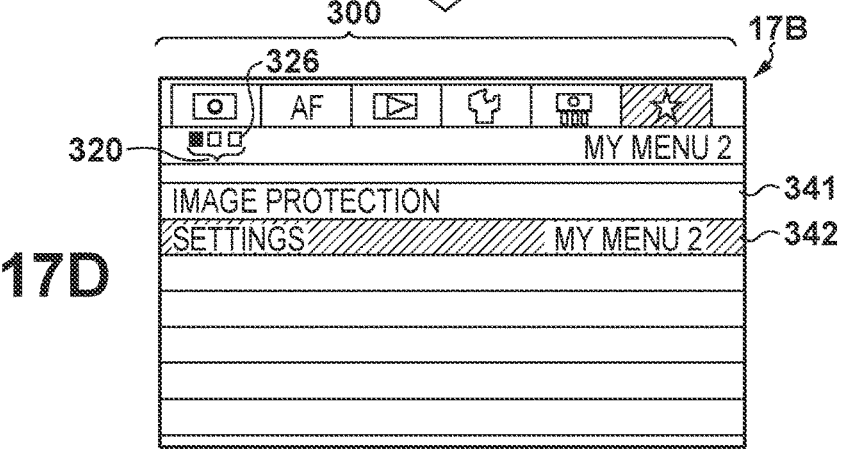

Upon selection of "settings" 342 on the screen 3C1 of FIG. 17A and selection of "delete tab" 1505 on a screen 15B of FIG. 17B, the control unit 210 displays a confirmation screen 17A of FIG. 17C for deletion of a tab. If a cancel button 1700 is pressed on the screen 17A, the control unit 210 displays the screen 3C1 without performing the processing for deleting a tab. On the other hand, if an OK button 1701 is pressed, the control unit 210 performs the processing for deleting a tab, thereby deleting a my menu small tab currently selected on an individual basis. Then, a transition is made to a screen 17B of FIG. 17D. Comparing the screen 17B after performing the processing for deleting a tab with the screen 3C1 before performing the processing for deleting a tab, the number of small tabs 320 is reduced by one.

Figure 17E:
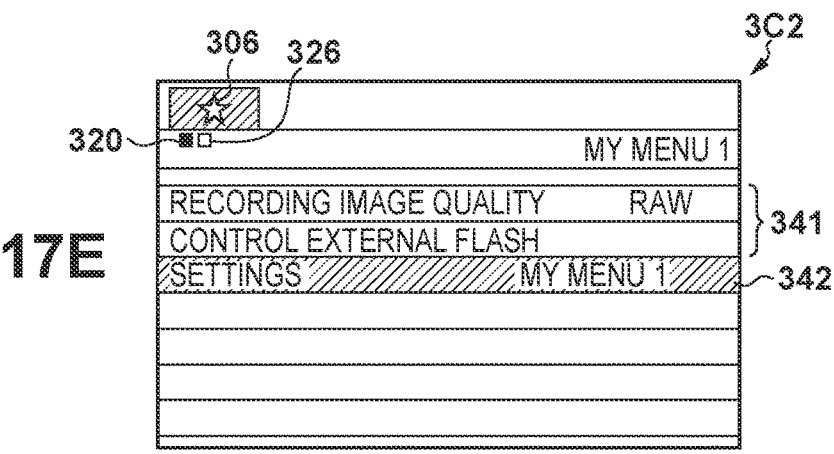
Figure 17F:
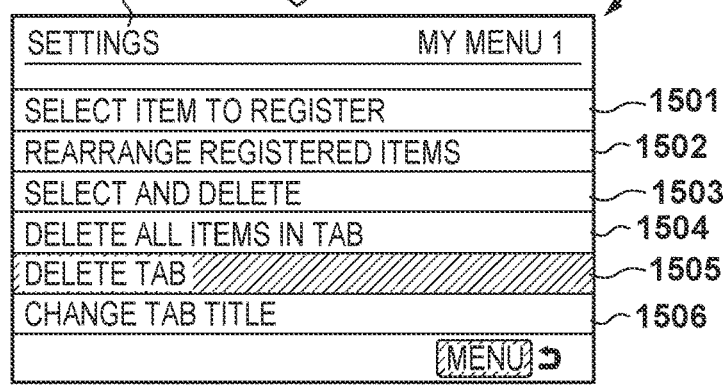

Next, a description is given of a screen transition in a case where "delete tab" 1505 is selected on a screen 15B of FIG. 17F that follows FIG. 17E in which the setting of "menu display" 334 is "display only my menu tab" and the number of my menu small tabs 320 is one.

Figure 17G:
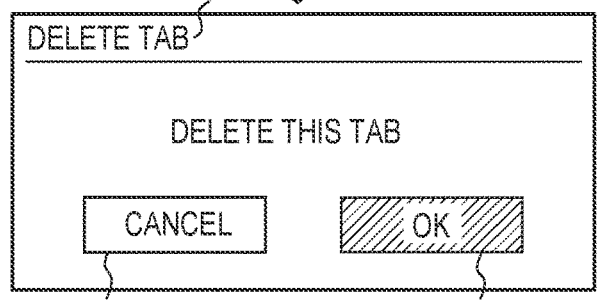
Figure 17H:
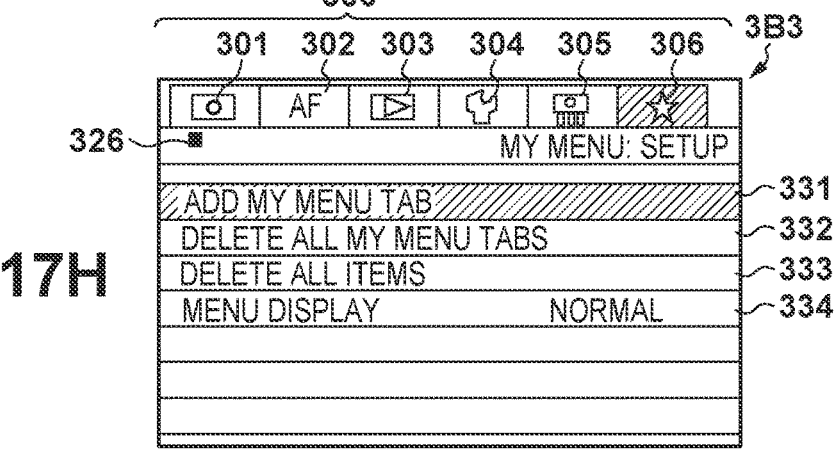

Upon selection of "settings" 342 on a screen 3C2 of FIG. 17E and selection of "delete tab" 1505 on a screen 15B of FIG. 17F, the control unit 210 displays a confirmation screen 17A of FIG. 17G for deletion of a tab. If a cancel button 1700 is pressed on the screen 17A, the control unit 210 displays the screen 3C2 without performing the processing for deleting a tab. On the other hand, if an OK button 1701 is pressed, the control unit 210 performs the processing for deleting a tab, thereby deleting a my menu small tab currently selected on an individual basis. Then, a transition is made to a screen 3B3 of FIG. 17H. Before the processing for deleting a tab is performed, only the my menu tab is displayed; in contrast, after the processing for deleting a tab is performed, all of the large tabs 300 are displayed. This is because no my menu small tab exists as a result of the tab deletion.

Figure 18:
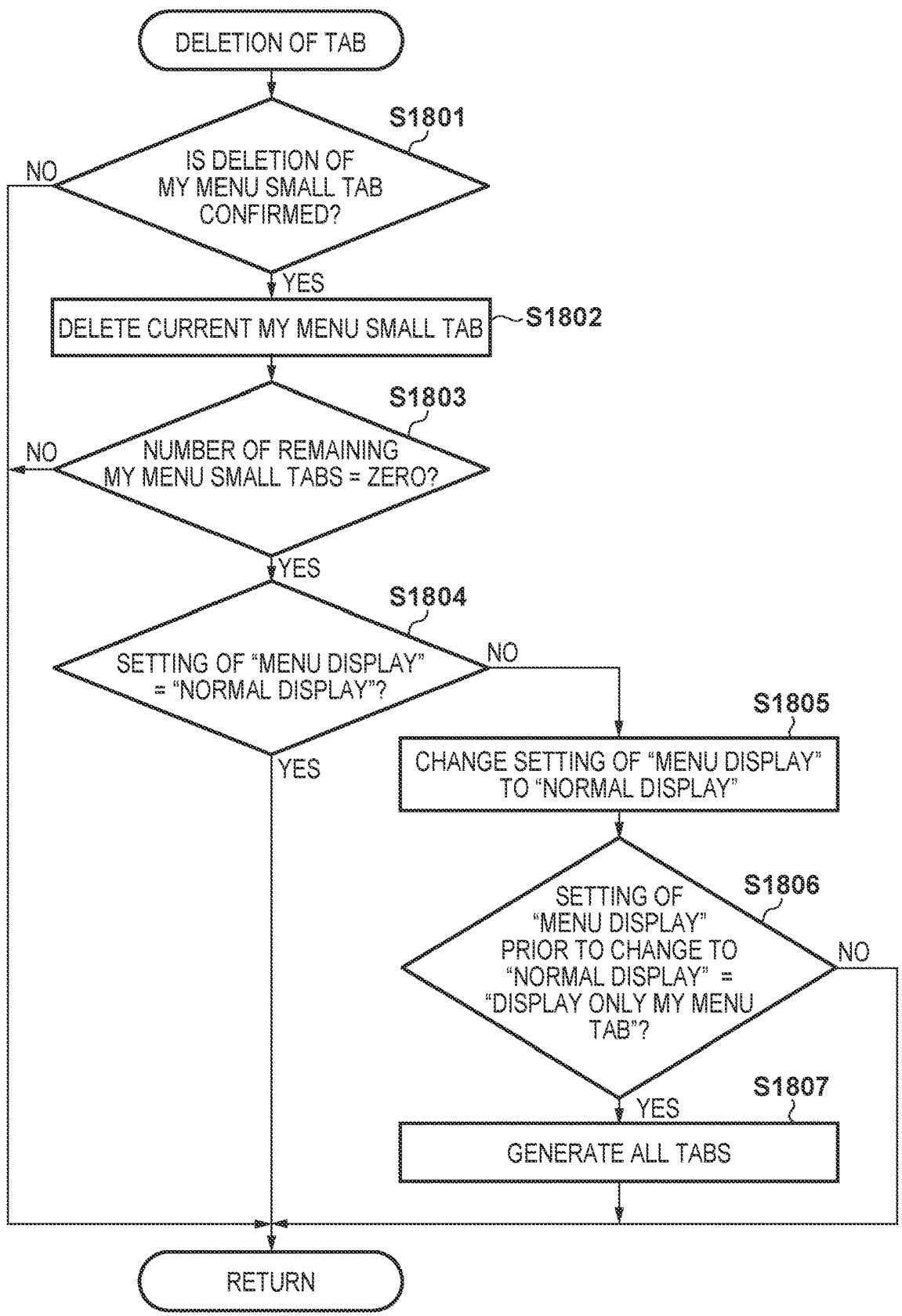
FIG. 18 is a flowchart showing the processing for deleting a tab in the processing for setting my menu.

The processing for deleting a tab will now be described with reference to FIG. 18.

In step S1801, the control unit 210 displays the screen 17A and confirms with the user whether to perform the processing for deleting a tab. It proceeds to step S1802 if the OK button 1701 is pressed on the screen 17A, and ends processing if the cancel button 1700 is pressed thereon.

The control unit 210 reduces the number of registered my menu small tabs 320 stored in the non-volatile memory 204 by one (deletion of a my menu small tab on an individual basis) in step S1802, and then proceeds to step S1803.

In step S1803, the control unit 210 reads the number of registered my menu small tabs stored in the non-volatile memory 204; it proceeds to step S1804 if the read number is zero, and ends processing otherwise.

In step S1804, the control unit 210 reads the setting of "menu display" 334 from the non-volatile memory 204 and determines whether the read setting is "normal display"; it ends processing if the read setting is "normal display", and proceeds to step S1805 otherwise.

In step S1805, the control unit 210 changes the setting of "menu display" 334 to "normal display", and stores the changed setting value into the non-volatile memory 204. The control unit 210 also saves the state prior to the change into the volatile memory 203 for use in determination of step S1806, and proceeds to step S1806.

In step S1806, the control unit 210 reads the setting of "menu display" 334 prior to the change, which was saved into the volatile memory 203 in step S1303, and determines whether the read setting is "display only my menu tab"; it proceeds to step S1807 if the read setting is "display only my menu tab", and ends processing otherwise.

In step S1807, the control unit 210 generates all of the large tabs other than my menu and small tabs.

It is presumed that, if no my menu small tab 320 is left in the end as a result of deleting a tab while "display my menu tab first" or "display only my menu tab" is set under "menu display" 334, the my menu functions are no longer necessary. In this case, it is presumed that the functions of "display only my menu tab" or "display my menu tab first" are also no longer necessary. In view of this, restoring the setting of "menu display" 334 to "normal display" when the number of my menu tabs reaches zero through the processing for deleting a tab achieves the effect of reducing the effort required by the user to restore the setting of "menu display" 334 to "normal display" after performing the processing for deleting a tab. Furthermore, when the number of my menu tabs reaches zero as a result of deleting a tab while "display only my menu tab" is set, all of the large tabs 300 are displayed at the same time as the deletion. This enables the user to instantly discern restoration to the setting "normal display" under "menu display" 334. Note that even in a state where the number of my menu small tabs is zero after the setting of "menu display" 334 is restored to "normal display", an item other than "normal display" can be set under "menu display" 334 in accordance with a user operation.

Figure 19A:
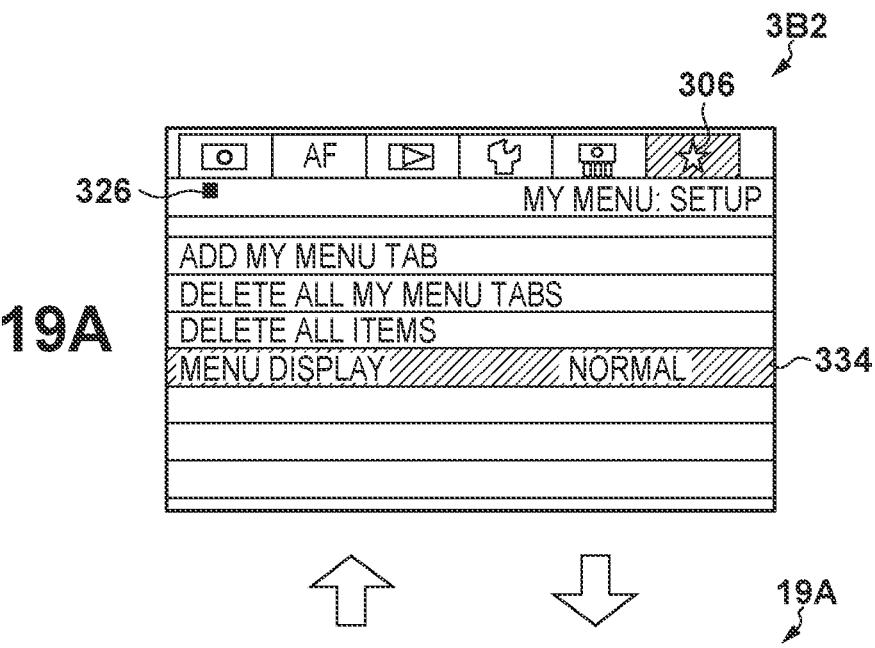
FIGS. 19A and 19B show a transition of a menu screen in setting menu display.
Figure 19B:
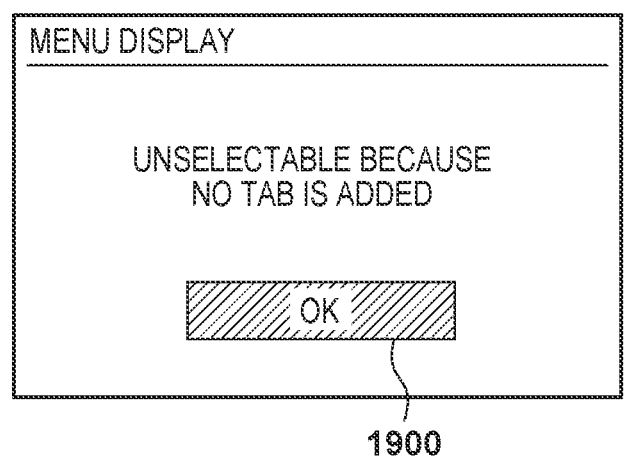

Note that in a state where the number of my menu small tabs is zero, the setting of "menu display" 334 may be fixed to "normal display", that is to say, placed in an unchangeable state. An example of this case will now be described. FIGS. 19A and 19B exemplarily show screens for a case in which "menu display" 334 is selected when there is no my menu small tab 320.

Upon selection of "menu display" 334, the control unit 210 displays a screen 19A of FIG. 19B. The screen 19A displays guidance indicating that "menu display" 334 cannot be selected because no my menu small tab 320 has been added (the number thereof is zero). If an OK button 1900 is pressed on the screen 19A, the control unit 210 displays a screen 3B2.

Normally, it is unimaginable that the user changes the setting of "menu display" 334, which is provided for the purpose of quickly accessing frequently-used functions, to "display my menu tab first" or "display only my menu tab" when there is no my menu small tab 320. In view of this, control for making the setting of "menu display" 334 unchangeable can prevent an accidental change in the setting of "menu display" 334 by a user who does not use my menu functions. That is to say, such control can avoid the inconvenience of displaying the my menu tab 306 first on a menu screen even though there is no my menu small tab 320.

<First Modification Example Related to Deletion of all My Menu Tabs>

The above embodiment has described an example in which, when "delete all my menu tabs" is performed while "display only my menu tab" is set, the setting of "menu display" 334 is automatically changed to "normal display" after deleting all my menu small tabs. However, no limitation is intended in this regard, and the user may confirm whether to change the setting to "normal display". An example of this case will now be described.

FIGS. 20A to 20G exemplarily show screens for a case in which "delete all my menu tabs" 332 is selected while "normal display" is set under "menu display" 334, and for a case in which "delete all my menu tabs" 332 is selected while "display only my menu tab" is set under the same.

Figure 20F:
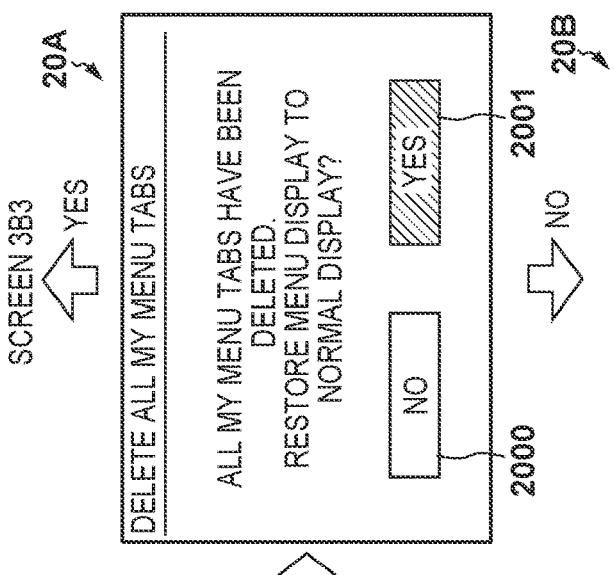
Figure 20G:
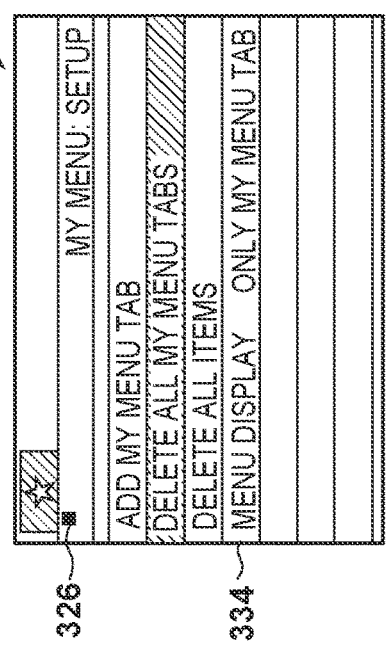
Figure 20E:
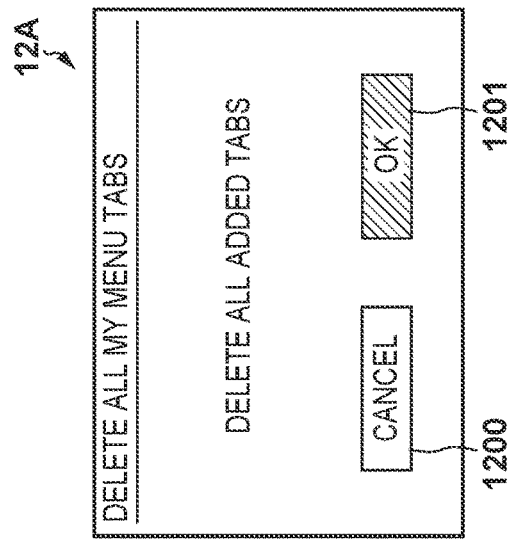
Figure 20D:
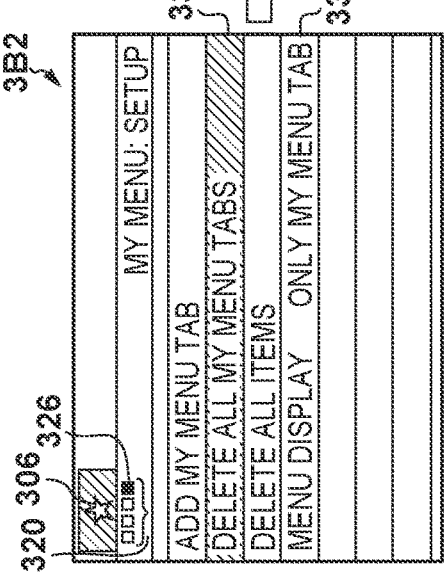

In the present example, when "delete all my menu tabs" has been performed, control is performed to display a screen 20A of FIG. 20F for confirming whether to restore the setting of "menu display" 334 to "normal display".

Upon selection of "delete all my menu tabs" 332 on a screen 3B1, which is in a state where "normal display" is set under "menu display" 334, the control unit 210 displays a screen 12A. On the other hand, upon selection of "delete all my menu tabs" 332 on a screen 3B2, which is in a state where "display only my menu tab" is set under "menu display" 334, the screen 12A is displayed similarly to the case in which "delete all my menu tabs" 332 is selected on the screen 3B1. Up until this point, processing is similar to FIGS. 12A and 12B; however, operations performed when an OK button 1201 is pressed on the screen 12A vary depending on the setting of "menu display" 334. If the OK button 1201 is pressed on the screen 12A, in a case where the setting of "menu display" 334 is "normal display", the control unit 210 changes the number of registered my menu small tabs stored in the non-volatile memory 204 to zero, and displays a screen 3B3 of FIG. 20C. In a case where the setting of "menu display" 334 is other than "normal display", it changes the number of registered my menu small tabs stored in the non-volatile memory 204 to zero, and displays the screen 20A. On the screen 20A, the control unit 210 displays guidance for confirming whether to restore the setting of "menu display" 334 to "normal display". If a YES button 2001 is selected on the screen 20A, the control unit 210 changes the setting of "menu display" 334 to "normal display", and displays the screen 3B3 by generating all tabs. On the other hand, if a NO button 2000 is pressed, the control unit 210 displays a screen 20B of FIG. 20G without changing the setting of "menu display" 334. On the screen 20B, "display only my menu tab" is set under "menu display" 334 although the number of my menu small tabs 320 is zero.

For a user who adds a my menu small tab again after deleting all my menu small tabs, extra effort is created by changing the state of "menu display" 334 to "normal display". In view of this, after deleting all my menu tabs, the screen for confirming whether to restore the setting of "menu display" 334 to "normal display" is displayed; this can reduce the effort required by the user who adds a my menu small tab again during operation.

<Second Modification Example Related to Deletion of All My Menu Tabs>

Figure 21F:
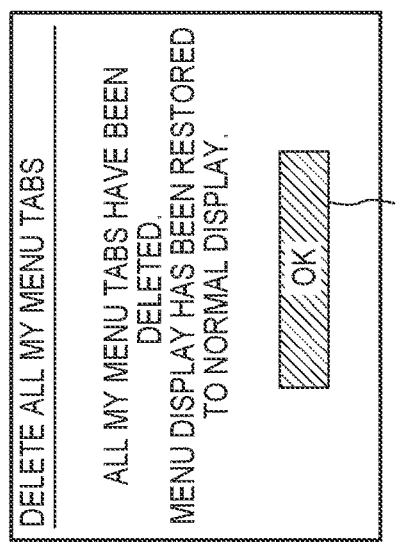
Figure 21E:
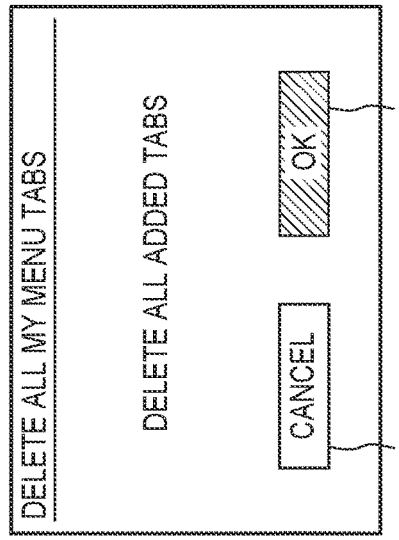
Figure 21D:
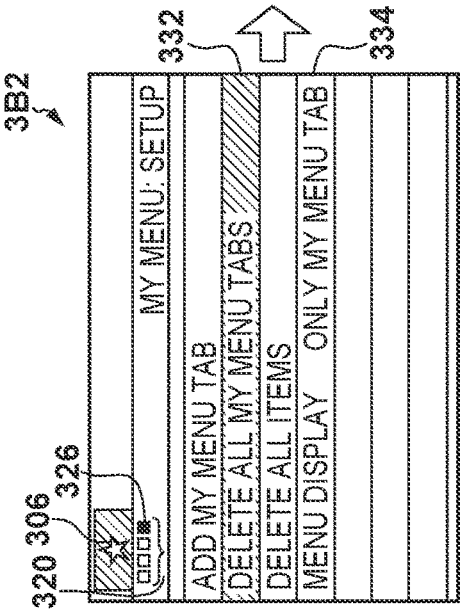
Figure 21G:
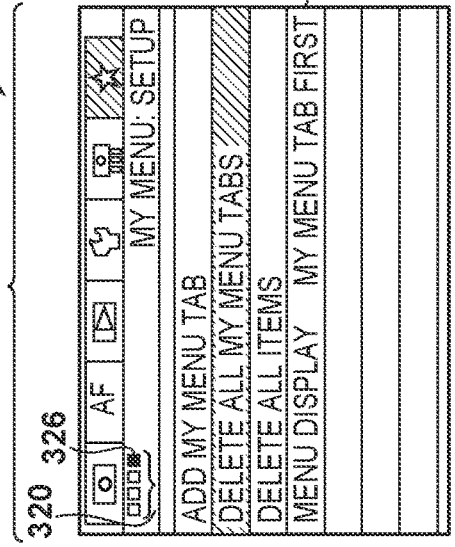

A description is now given of another example of a case in which "delete all my menu tabs" has been performed. FIGS. 21A to 21G exemplarily show a screen transition based on the setting of "menu display" 334. FIG. 21A exemplarily shows a screen 3B1 for a case in which the setting of "menu display" 334 is "normal display". FIG. 21D exemplarily shows a screen 3B2 for a case in which the setting of "menu display" 334 is "display only my menu tab". FIG. 21G exemplarily shows a screen 21B for a case in which the setting of "menu display" 334 is "display my menu tab first".

In the present example, when "delete all my menu tabs" has been performed, control is performed to display a screen 21A of FIG. 21F indicating that the setting of "menu display" 334 has been restored to the original state.

Upon selection of "delete all my menu tabs" 332 on any of the screens 3B1, 3B2, and 21B, the control unit 210 displays a screen 12A. Upon selection of an OK button 1201 on the screen 12A, the control unit 210 changes the number of registered my menu small tabs stored in the non-volatile memory 204 to zero. In a case where the setting of "menu display" 334 is "normal display", the control unit 210 displays a screen 3B3 of FIG. 21C; in a case where the setting of "menu display" 334 is other than "normal display", it changes the setting to "normal display" and displays the screen 21A. On the screen 21A, the control unit 210 notifies the user of the change in the setting of "menu display" 334 to "normal display" by displaying guidance to that effect. If an OK button 2100 is pressed on the screen 21A, the control unit 210 generates all tabs and displays the screen 3B3.

For a user who registers my menu again after deleting all my menu tabs, he/she may not want the setting of "menu display" 334 to be changed to "normal display".

A user who has configured the setting to "display only my menu tab" can discern the change in the setting because large tabs other than the my menu tab 306 are displayed on the screen 3B3, which is displayed after deleting all my menu tabs. However, for a user who has configured the setting of "menu display" 334 to "display my menu tab first", the display state of the large tabs 300 does not change even if the setting is restored to "normal display", which gives rise to the possibility that the user may not notice restoration to the setting "normal display". Explicitly informing such a user of restoration to the setting "normal display" under "menu display" 334 enables the user to instantly notice the change in the setting.

<Third Modification Example Related to Deletion of All My Menu Tabs>

Figure 22A:
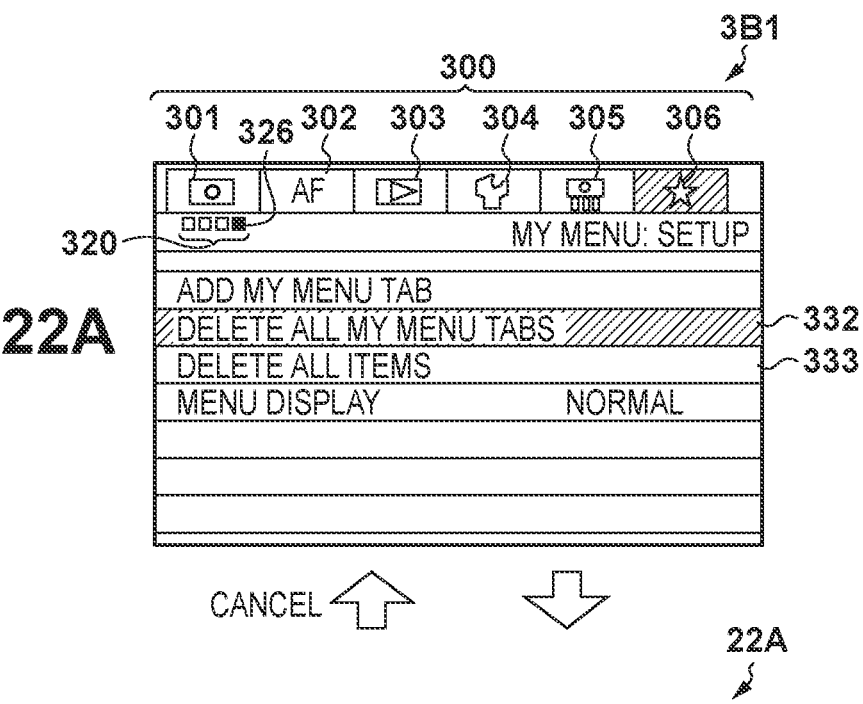
FIGS. 22A to 22C show a transition of a menu screen in the processing for deleting all my menu tabs.
Figure 22B:
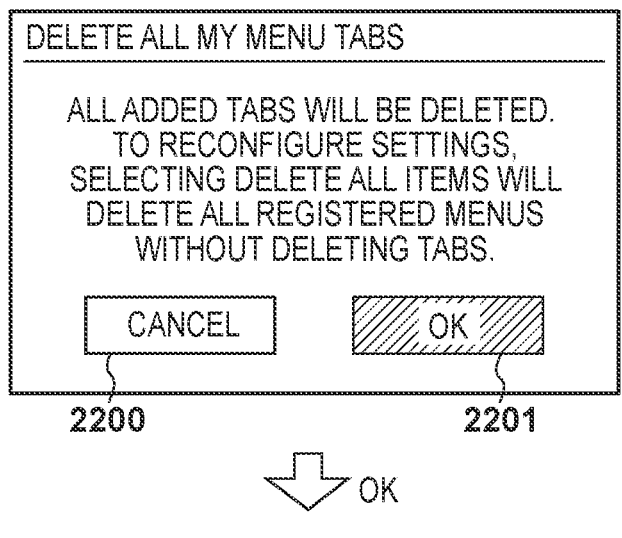
Figure 22C:
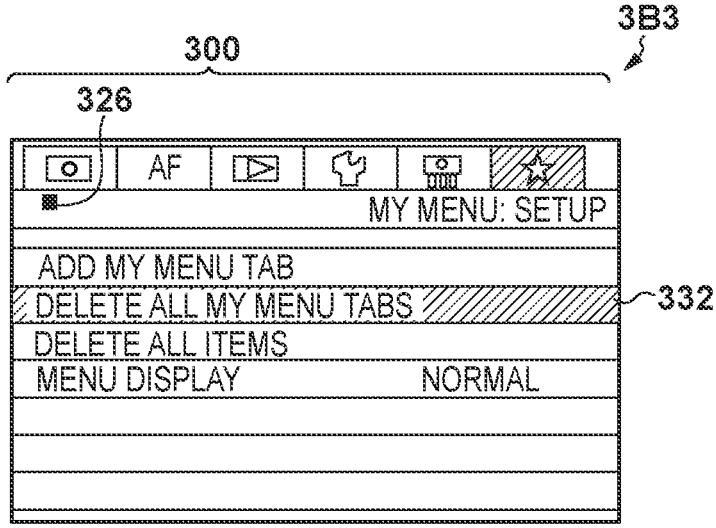

A description is now given of still another example of a case in which "delete all my menu tabs" has been performed. FIGS. 22A to 22C exemplarily show a screen transition in a case where "delete all my menu tabs" 332 is selected while "normal display" is set under "menu display" 334.

In the present example, when "delete all my menu tabs" 332 is selected on a screen 3B1 of FIG. 22A, control is performed to display a screen 22A of FIG. 22B suggesting "delete all items" 333.

Upon selection of "delete all my menu tabs" 332 on the screen 3B1, the control unit 210 displays the screen 22A. The control unit 210 notifies the user of the following guidance by displaying the same on the screen 22A: to reconfigure the settings of my menu, "delete all items" will delete all of the registered items without deleting the my menu small tabs. If an OK button 2201 is pressed on the screen 22A, the control unit 210 changes the number of registered my menu small tabs stored in the non-volatile memory 204 to zero, and displays a screen 3B3 of FIG. 22C. On the other hand, if a cancel button 2200 is pressed, the control unit 210 displays the screen 3B1 without deleting my menu small tabs.

If a user intends to register my menu again after deleting all my menu small tabs, the user needs to perform "add my menu tab" 331 after the deletion. It is hence presumed that the effort of performing "add my menu tab" may be reduced by performing "delete all items" 333, which deletes all items registered on the my menu small tabs, without performing "delete all my menu tabs" 332. In view of this, by notifying such a user of the option "delete all items" before deleting all my menu small tabs, the user can recognize the possibility of reduction in the effort required by the user.

Note that a single item of hardware may control the control unit 210, or the entire apparatus may be controlled by a plurality of items of hardware sharing processing.

In the above-described embodiments, when "normal display" is set, display of a menu screen is started with a selection of a large tab that was selected last on a previous menu screen. However, no limitation is intended in this regard, and display of a menu screen may be started with a selection of a predetermined large tab other than the my menu tab 306. For example, when "normal display" is set, display of a menu screen may always be started while the shooting tab 301, which is a leftmost large tab, and a leftmost small tab are selected, regardless of a large tab that was selected last on a previous menu screen.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Although the above embodiments have described an example in which the present invention is applied to an image capturing apparatus such as a digital camera, the present invention is not limited to this example. The present invention is applicable to, for example, an electronic apparatus capable of setting to display a custom menu (my menu) in preference to a normal menu on a menu screen. More specifically, the present invention is applicable to a tablet, a smart phone which is a kind of a mobile telephone terminal, a PDA (Personal Digital Assistant), a mobile image viewer, a game console, an electronic book reader, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-186864, 2014-186865, and 2014-187036, filed Sep. 12, 2014, which are hereby incorporated by reference herein in their entirety.

What is claimed is:

1. An electronic apparatus comprising:
a memory and at least one processor which function as:
a registration unit configured to register a menu item that has been designated by a user from among a plurality of menu items as an item of a customized menu;
a setting unit configured to set one of a plurality of menu display modes including a first menu display mode and a second menu display mode when displaying a menu screen, the first menu display mode displaying a plurality of items including a first item and a second item in a selectable manner in a menu section in a first layer above a layer of the customized menu, the second menu display mode displaying the second item in the menu section without displaying the first item, the customized menu belonging to the second item as a lower layer therebelow, the customized menu is not displayed based on selecting of the first item and is displayed based on selecting of the second item; and
a display control unit configured to perform control to, in a case where the customized menu is eliminated through processing for deleting the customized menu while the second menu display mode is set, switch from the second menu display mode to the first menu display mode and then display the menu screen.

2. The apparatus according to claim 1, wherein the first menu display mode is a display mode for starting display of the menu screen while an item selected last at a previous time, or a predetermined item other than the second item, is selected from among the plurality of items displayed in the menu section in the first layer.

3. The apparatus according to claim 1, wherein the plurality of menu display modes that can be set by the setting unit include a third menu display mode for starting display of the menu screen while the second item is selected from among the plurality of items in the menu section in the first layer.

4. The apparatus according to claim 1, further comprising:
an addition unit configured to add the customized menu; and
a deletion unit configured to delete the customized menu.

5. The apparatus according to claim 1, wherein when the second item is selected, the display control unit performs control to display a first-type item that enables selection of the customized menu and a second-type item as options in a second layer below the first layer, and
the second-type item is an option for displaying a menu including a menu item for adding the customized menu and a menu item for deleting the customized menu.

6. The apparatus according to claim 1, wherein when the customized menu is not registered, the setting unit does not change a menu display mode in accordance with a user operation.

7. The apparatus according to claim 1, wherein before switching to the first menu display mode based on elimination of the customized menu, the display control unit performs control to confirm with the user whether to switch to the first menu display mode by way of display.

8. The apparatus according to claim 1, wherein upon switching to the first menu display mode based on elimination of the customized menu, the display control unit performs control to notify the user of switching to the first menu display mode by way of display.

9. The apparatus according to claim 1, wherein upon selection of a menu item for performing a function of deleting the customized menu, the display control unit performs control to display, to the user, a notification indicating that one of the following functions can be performed: a function of deleting the customized menu; and a function of deleting only a menu item belonging to the customized menu without deleting the customized menu.

10. The apparatus according to claim 1, further comprising
a first instruction unit configured to issue an instruction for starting display of the menu screen; and
a second instruction unit configured to change a selected item in the menu section in the first layer on the menu screen.

11. A control method of an electronic apparatus, comprising:
a registration step of registering a menu item that has been designated by a user from among a plurality of menu items as an item of a customized menu;

a setting step of setting one of a plurality of menu display modes including a first menu display mode and a second menu display mode when displaying a menu screen, the first menu display mode displaying a plurality of items including a first item and a second item in a selectable manner in a menu section in a first layer above a layer of the customized menu, the second menu display mode displaying the second item in the menu section without displaying the first item, the customized menu belonging to the second item as a lower layer therebelow, the customized menu is not displayed based on selecting of the first item and is displayed based on selecting of the second item; and a display control step of performing control to, in a case where the customized menu is eliminated through processing for deleting the customized menu while the second menu display mode is set, switch from the second menu display mode to the first menu display mode and then display the menu screen.

12. A non-transitory computer-readable storage medium storing a program for causing a computer to function as a registration unit, a setting unit and a display control unit of an electronic apparatus, wherein the registration unit is configured to register a menu item that has been designated by a user from among a plurality of menu items as an item of a customized menu, the setting unit is configured to set one of a plurality of menu display modes including a first menu display mode and a second menu display mode when displaying a menu screen, the first menu display mode displaying a plurality of items including a first item and a second item in a selectable manner in a menu section in a first layer above a layer of the customized menu, the second menu display mode displaying the second item in the menu section without displaying the first item, the customized menu belonging to the second item as a lower layer therebelow, the customized menu is not displayed based on selecting of the first item and is displayed based on selecting of the second item, and the display control unit is configured to perform control to, in a case where the customized menu is eliminated through processing for deleting the customized menu while the second menu display mode is set, switch from the second menu display mode to the first menu display mode and then display the menu screen.

\* \* \* \* \*